(12) United States Patent
Komai

(10) Patent No.: US 11,863,887 B2
(45) Date of Patent: Jan. 2, 2024

(54) IMAGE SENSOR AND IMAGE-CAPTURING DEVICE

(71) Applicant: NIKON CORPORATION, Tokyo (JP)

(72) Inventor: Atsushi Komai, Tokorozawa (JP)

(73) Assignee: NIKON CORPORATION, Tokyo (JP)

( * ) Notice: Subject to any disclaimer, the term of this patent is extended or adjusted under 35 U.S.C. 154(b) by 0 days.

(21) Appl. No.: 17/965,954

(22) Filed: Oct. 14, 2022

(65) Prior Publication Data
US 2023/0036138 A1  Feb. 2, 2023

Related U.S. Application Data

(63) Continuation of application No. 16/475,643, filed as application No. PCT/JP2018/003301 on Jan. 31, 2018, now Pat. No. 11,509,841.

(30) Foreign Application Priority Data

Jan. 31, 2017 (JP) ................. 2017-016283

(51) Int. Cl.
 *H04N 25/59* (2023.01)
 *H04N 25/46* (2023.01)
 *H04N 25/75* (2023.01)
 *H04N 25/79* (2023.01)

(52) U.S. Cl.
 CPC ............ *H04N 25/59* (2023.01); *H04N 25/46* (2023.01); *H04N 25/75* (2023.01); *H04N 25/79* (2023.01)

(58) Field of Classification Search
 CPC ...... H04N 5/3559; H04N 5/379; H04N 5/347; H04N 5/378; H04N 25/59; H04N 25/46; H04N 25/75; H04N 25/79
 See application file for complete search history.

(56) References Cited

U.S. PATENT DOCUMENTS

| 6,452,153 B1 | 9/2002 | Lauxtermann et al. |
| 11,006,056 B2 | 5/2021 | Komai |
| 2003/0010896 A1 | 1/2003 | Kaifu et al. |
| 2004/0188729 A1 | 9/2004 | Uchida et al. |

(Continued)

FOREIGN PATENT DOCUMENTS

| JP | 2012-216940 A | 11/2012 |
| JP | 2015-204469 A | 11/2015 |

(Continued)

OTHER PUBLICATIONS

Apr. 17, 2018 International Search Report issued in International Patent Application No. PCT/JP2018/003301.

(Continued)

*Primary Examiner* — Nicholas G Giles
(74) *Attorney, Agent, or Firm* — Oliff PLC

(57) ABSTRACT

An image sensor including a pixel that includes: a first photoelectric conversion unit and a second photoelectric conversion unit, each of which generates an electric charge through photoelectric conversion of light; an output unit that outputs a first signal generated based upon the electric charge generated in the first photoelectric conversion unit and a second signal generated based upon an electric charge generated in the second photoelectric conversion unit; and an adjustment unit that adjusts a capacitance at the output unit upon outputting of the first signal and the second signal from the output unit.

19 Claims, 13 Drawing Sheets

(56) References Cited

U.S. PATENT DOCUMENTS

| | | |
|---|---|---|
| 2012/0249852 A1 | 10/2012 | Fukuda |
| 2015/0296155 A1 | 10/2015 | Tanaka |
| 2015/0312491 A1 | 10/2015 | Egawa |
| 2016/0219237 A1 | 7/2016 | Kobayashi et al. |
| 2016/0337567 A1 | 11/2016 | Okura et al. |
| 2016/0373668 A1 | 12/2016 | Komai et al. |
| 2017/0034466 A1* | 2/2017 | Numata ............... H04N 25/585 |

FOREIGN PATENT DOCUMENTS

| | | |
|---|---|---|
| JP | 2015-211257 A | 11/2015 |
| JP | 2016-15680 A | 1/2016 |
| JP | 2016-139859 A | 8/2016 |

OTHER PUBLICATIONS

Mar. 3, 2021 Office Action issued in U.S. Appl. No. 16/475,643.
Jan. 7, 2021 Office Action issued in Chinese Patent Application No. 201880009277.7.
Nov. 16, 2021 Office Action issued in U.S. Appl. No. 16/475,643.
Nov. 9, 2021 Office Action issued in Japanese Patent Application No. 2018-565627.
Apr. 5, 2022 Office Action issued in U.S. Appl. No. 16/475,643.
Apr. 17, 2018 International Search Report issued in International Patent Application No. PCT/JP2018/003302.
Jul. 7, 2020 Office Action issued in U.S. Appl. No. 16/475,651.
Jan. 13, 2021 Notice of Allowance issued in U.S. Appl. No. 16/475,651.
Dec. 16, 2020 Office Action issued in Chinese Patent Application No. 201880009276.2.
Jul. 20, 2022 Notice of Allowance issued in U.S. Appl. No. 16/475,643.
Jul. 26, 2021 Office Action issued in U.S. Appl. No. 16/475,643.
Apr. 18, 2023 Office Action issued in Japanese Patent Application No. 2022-078719.

* cited by examiner

IMAGE SENSOR AND IMAGE-CAPTURING DEVICE

This is a Continuation of U.S. patent application Ser. No. 16/475,643 filed Jan. 3, 2020 (now U.S. Pat. No. 11,509,841), which is a U.S. National Stage of International Application No. PCT/JP2018/003301 filed Jan. 31, 2018, which claims priority from Japanese Application No. 2017-016283 filed in Japan on Jan. 31, 2017. The disclosure of each of the above-identified prior applications is incorporated by reference herein in its entirety.

TECHNICAL FIELD

The present invention relates to an image sensor and an image-capturing device.

BACKGROUND ART

There is an image-capturing device known in the related art that adds together (combines) electric charges generated in two light receiving elements and reads out the potential corresponding to the sum of the electric charges (see PTL 1). There is an issue yet to be effectively addressed in the image-capturing device in the related art in that the conversion gain at which the electric charge sum is converted to a potential is bound to fluctuate.

CITATION LIST

Patent Literature

PTL 1: Japanese Laid Open Patent Publication No. 2016-139859

SUMMARY OF INVENTION

According to the 1st aspect of the present invention, an image sensor including a pixel that comprises: a first photoelectric conversion unit and a second photoelectric conversion unit, each of which generates an electric charge through photoelectric conversion of light; an output unit that outputs a first signal generated based upon the electric charge generated in the first photoelectric conversion unit and a second signal generated based upon an electric charge generated in the second photoelectric conversion unit; and an adjustment unit that adjusts a capacitance at the output unit upon outputting of the first signal and the second signal from the output unit.

According to the 2nd aspect of the present invention, an image sensor including a pixel that comprises: a first photoelectric conversion unit and a second photoelectric conversion unit, each of which generates an electric charge through photoelectric conversion of light; a first output unit that outputs a signal generated based upon the electric charge generated by the first photoelectric conversion unit and is connected to a first signal line; a second output unit that outputs a signal generated based upon an electric charge generated by the second photoelectric conversion unit and is connected to a second signal line; and a first connection unit disposed between the first output unit and the second output unit.

According to the 3rd aspect of the present invention, an electronic camera comprises: the image sensor according to the 1st or 2nd aspect; and an image generation unit that generates image data based upon signals output from the image sensor.

DESCRIPTION OF EMBODIMENTS

First Embodiment

Figure 1:
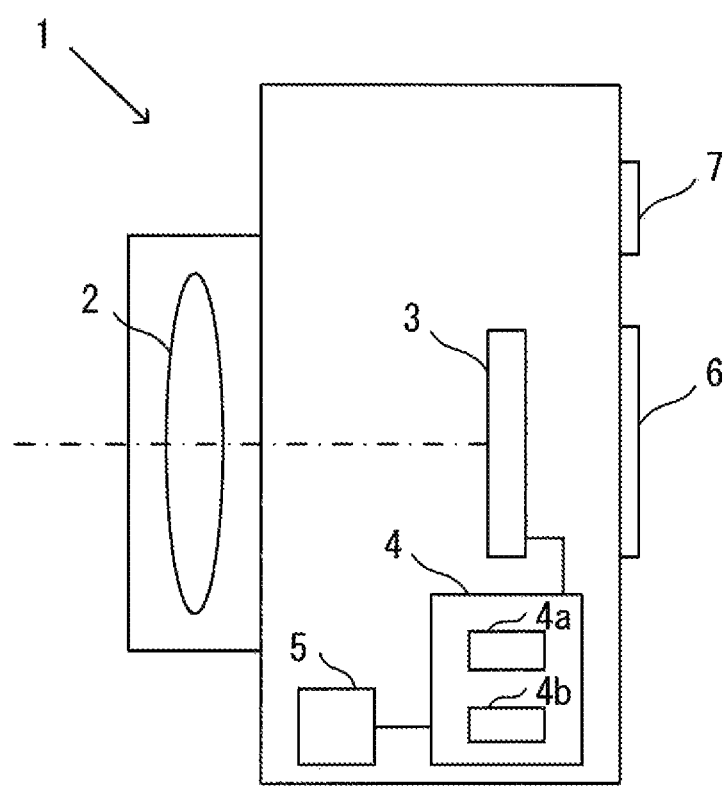
FIG. 1 A block diagram illustrating the structure of the image-capturing device in a first embodiment FIG. 2 A circuit diagram illustrating the pixel structure adopted in the first embodiment FIG. 3 An illustration presenting an example of an operation that may be executed in the image sensor in the first embodiment FIG. 4 An illustration presenting another example of an operation that may be executed in the image sensor in the first embodiment FIG. 5 A circuit diagram illustrating the structure of the image sensor in the first embodiment in an abridged presentation FIG. 6 A timing chart pertaining to an example of an operation that may be executed in the image sensor in the first embodiment FIG. 7 A timing chart pertaining to another example of an operation that may be executed in the image sensor in the first embodiment FIG. 8 A circuit diagram illustrating the pixel structure adopted in a second embodiment FIG. 9 A circuit diagram illustrating the pixel structure adopted in a third embodiment FIG. 10 A circuit diagram illustrating the structure of the image sensor in the third embodiment in an abridged presentation FIG. 11 A timing chart pertaining to an example of an operation that may be executed in the image sensor in the third embodiment FIG. 12 A timing chart pertaining to another example of an operation that may be executed in the image sensor in the third embodiment FIG. 13 A circuit diagram illustrating the pixel structure adopted in variation 1

FIG. 1 is a block diagram illustrating the structure of the image-capturing device in the first embodiment. The image-capturing device in the first embodiment may be an electronic camera 1 (hereafter will be referred to as a camera 1) adopting a structure such as that shown in FIG. 1. The camera 1 comprises an image-capturing optical system (image forming optical system) 2, an image sensor 3, a control unit 4, a memory 5, a display unit 6 and an operation unit 7. The image-capturing optical system 2, which includes a plurality of lenses such as a focus adjustment lens (focus lens) and an aperture, forms a subject image at the image sensor 3. It is to be noted that the image-capturing optical system 2 may be an interchangeable system that can be mounted at and dismounted from the camera 1.

The image sensor 3 may be, for instance, a CMOS image sensor. The image sensor 3 captures a subject image by receiving a light flux having passed through the exit pupil at the image-capturing optical system 2. As will be described in detail later, a plurality of pixels, each having a microlens and a plurality of photoelectric conversion units (e.g., two photoelectric conversion units), are disposed in a two dimensional array (along a row direction in which rows extend and a column direction in which columns extend, running perpendicular to the row direction) at the image sensor 3. The photoelectric conversion units may each be constituted with, for instance, a photodiode (PD). The image sensor 3 generates signals through photoelectric conversion of light entering therein and outputs the generated signals to the control unit 4.

As will be explained in detail later, the image sensor 3 outputs to the control unit 4, a signal used to generate image data, i.e., an image-capturing signal, and a pair of focus detection signals used in phase focus detection of the focusing condition at the image-capturing optical system 2, i.e., a first focus detection signal and a second focus detection signal. The first and second focus detection signals are generated through photoelectric conversion of a first image and a second image respectively formed with a first light flux and a second light flux having passed through a first area and a second area of the exit pupil at the image-capturing optical system 2.

The memory 5 may be, for instance, a recording medium such as a memory card. Image data and the like are recorded into the memory 5. Data are written into and read out from the memory 5 by the control unit 4. At the display unit 6, an image based upon image data is displayed, as well as photographic information indicating the shutter speed, the aperture value, etc., a menu screen and the like. The operation unit 7, which includes various types of setting switches such as a shutter release button, a power switch, and the like, outputs an operation signal corresponding to a given operation to the control unit 4.

The control unit 4, configured with a CPU, a ROM, a RAM and the like, controls various components of the camera 1 based upon a control program. The control unit 4 includes an image data generation unit 4a and a focus detection unit 4b. The image data generation unit 4a generates image data by executing various types of image processing on image-capturing signals output from the image sensor 3. The various types of image processing include image processing of the known art such as gradation conversion processing, color interpolation processing and edge enhancement processing.

The focus detection unit 4b executes focus detection processing required to enable autofocus (AF) at the image-capturing optical system 2 through a phase detection method of the known art. In more specific terms, the focus detection unit 4b detects an image shift quantity representing the extent to which the first image and the second image are offset relative to each other based upon the pair of focus detection signals output from the image sensor 3 and calculates a defocus quantity based upon the image shift quantity thus detected. As the focus adjustment lens is driven in correspondence to the defocus quantity, the focusing condition is automatically adjusted.

The control unit 4 executes processing through which signals from the plurality of photoelectric conversion units in each pixel at the image sensor 3 are individually read out (a first control mode) and processing through which signals from the plurality of photoelectric conversion units are first added together and the resulting sum is read out (a second control mode). In the first control mode, the control unit 4 in the embodiment individually, i.e., independently, reads out a signal generated based upon an electric charge generated in a first photoelectric conversion unit and a signal generated based upon an electric charge generated in a second photoelectric conversion unit as a pair of focus detection signals, as will be explained in detail later.

In the second control mode, the control unit 4 executes addition processing for adding together signals from the first photoelectric conversion unit and the second photoelectric conversion unit and reads out the sum as an image-capturing signal. The "addition processing" in this context includes processing for averaging a plurality of signals, processing for adding together a plurality of signals by weighting them, and the like. When executing AF through the phase difference method, the control unit 4 executes processing in the first control mode so as to read out the pair of focus detection signals from the image sensor 3, whereas when generating image data, the control unit 4 executes processing in the second control mode so as to read out the image-capturing signal from the image sensor 3.

Figure 2:
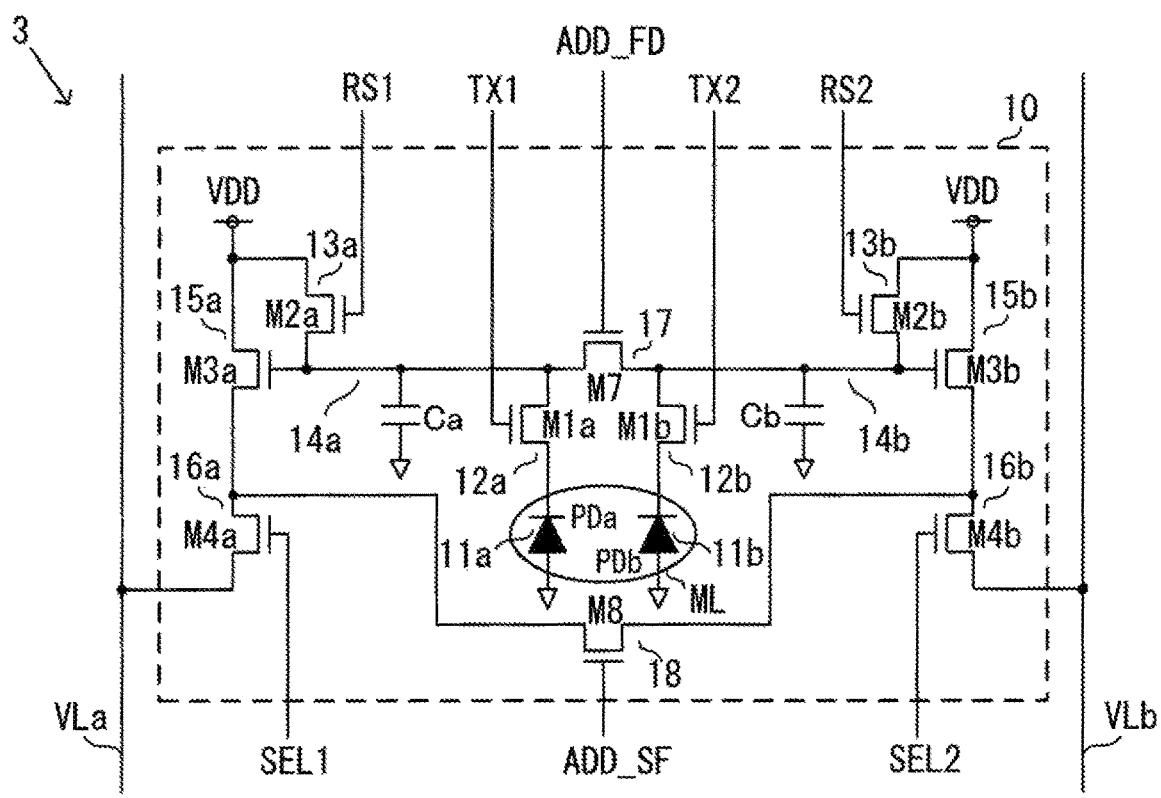

FIG. 2 is a circuit diagram illustrating the structure adopted in the pixels at the image sensor 3 in the first embodiment. A pixel 10 includes a microlens ML, a first photoelectric conversion unit 11a, a second photoelectric conversion unit 11b, a first transfer unit 12a, a second transfer unit 12b, a first reset unit 13a, a second reset unit 13b, a first floating diffusion (FD) 14a and a second floating diffusion (FD) 14b. The pixel 10 further includes a first amplifier unit 15a, a second amplifier unit 15b, a first selection unit 16a, a second selection unit 16b, an addition switch unit 17 and a coupler switch unit 18.

Light having entered via the image-capturing optical system 2 shown in FIG. 1 is condensed via the microlens ML onto the first photoelectric conversion unit 11a and the second photoelectric conversion unit 11b. It is to be noted that the microlens ML is indicated with a line forming an ellipsoid enclosing the first and second photoelectric conversion units 11a and 11b so as to illustrate that light fluxes, having passed through the microlens ML, enter the first photoelectric conversion unit 11a and the second photoelectric conversion unit 11b. The elliptical shape does not represent the actual size or the actual shape of the microlens ML.

The first photoelectric conversion unit 11a0 and the second photoelectric conversion unit 11b, constituted with photodiodes PD (PDa and PDb), have a function of converting light having entered therein to electric charges and accumulating the electric charges resulting from the photoelectric conversion. The first photoelectric conversion unit 11a and the second photoelectric conversion unit 11b, disposed in correspondence to a single microlens ML, receive light fluxes having passed through different areas of the exit pupil at the image-capturing optical system 2. In other words, at the first photoelectric conversion unit 11a and the second photoelectric conversion unit 11b, a first image and a second image respectively formed with a first light flux and a second light flux having passed through a first area and a second area of the exit pupil at the image-capturing optical system 2, undergo photoelectric conversion.

The first transfer unit 12a, which is constituted with a transistor M1a controlled with a signal TX1, transfers the electric charge resulting from photoelectric conversion at the first photoelectric conversion unit 11a to the first FD 14a. Namely, the first transfer unit 12a forms an electric charge transfer path between the first photoelectric conversion unit 11a and the first FD 14a. The transistor M1a is a first transfer transistor. At a capacitor Ca in the first FD 14a, the electric charge transferred to the first FD 14a is accumulated (held) and the electric charge is converted to a voltage by dividing the electric charge by the capacitance value at the capacitor Ca. A reference sign Ca assigned to the capacitor indicates a capacitance added to the first FD 14a in a schematic presentation. The capacitance Ca includes capacitances (parasitic capacitances) of various transistors, such as the gate capacitance in the first amplifier unit 15a connected to the first FD 14a, a wiring capacitance and the like. It is to be noted that a gate capacitance is a parasitic capacitance between a transistor gate and a back gate.

The first amplifier unit 15a amplifies a signal generated based upon the electric charge accumulated in the capacitor Ca, and outputs the amplified signal. The first amplifier unit 15a is constituted with a transistor M3a, a drain (terminal), a gate (terminal) and a source (terminal) of which are respectively connected to a source VDD, the first FD 14a and a first selection unit 16a. The source of the first amplifier unit 15a is connected to a first vertical signal line VLa via the first selection unit 16a. The first amplifier unit 15a functions as part of a source follower circuit with a first electric current source 25a in FIG. 3 acting as a load current source. The transistor M3a is a first amplifier transistor.

The first reset unit 13a, which is constituted with a transistor M2a controlled with a signal RS1, resets the electric charge in the capacitor Ca and resets the voltage at the first FD 14a. The transistor M2a is a first reset transistor. The first selection unit 16a, which is constituted with a transistor M4a controlled with a signal SEL1, outputs the signal provided from the first amplifier unit 15a to the first vertical signal line VLa. The transistor M4a is a first selection transistor. A first output unit in the embodiment, configured with the first amplifier unit 15a and the first selection unit 16a, generates a signal based upon an electric charge generated in the first photoelectric conversion unit 11a and outputs the signal thus generated.

The second transfer unit 12b, which is constituted with a transistor M1b controlled with a signal TX2, transfers the electric charge resulting from photoelectric conversion at the second photoelectric conversion unit 11b to the second FD 14b. Namely, the second transfer unit 12b forms an electric charge transfer path between the second photoelectric conversion unit 11b and the second FD 14b. The transistor M1b is a second transfer transistor. At a capacitor Cb in the second FD 14b, the electric charge transferred to the second FD 14b is accumulated and the electric charge is converted to a voltage by dividing the electric charge by the capacitance value at the capacitor Cb. A reference sign Cb assigned to the capacitor indicates a capacitance added to the second FD 14b in a schematic presentation. The capacitance Cb includes capacitances at various transistors, such as the gate capacitance in the second amplifier unit 15b connected to the second FD 14b, a wiring capacitance and the like.

The second amplifier unit 15b amplifies a signal generated based upon the electric charge accumulated in the capacitor Cb, and outputs the amplified signal. The second amplifier unit 15b is constituted with a transistor M3b, a drain, a gate and a source of which are respectively connected to a source VDD, the second FD 14b and the second selection unit 16b. The source of the second amplifier unit 15b is connected to a second vertical signal line VLb via the second selection unit 16b. The second amplifier unit 15b functions as part of a fourth follower circuit with a second electric current source 25b in FIG. 3 acting as a load current source. The transistor M3b is a second amplifier transistor.

The second reset unit 13b, which is constituted with a transistor M2b controlled with a signal RS2, resets the electric charge in the capacitor Cb and resets the voltage at the second FD 14b. The transistor M2b is a second reset transistor. The second selection unit 16b, which is constituted with a transistor M4b controlled with a signal SEL2, outputs the signal provided from the second amplifier unit 15b to the second vertical signal line VLb. The transistor M4b is a second selection transistor. A second output unit in the embodiment, configured with the second amplifier unit 15b and the second selection unit 16b, generates a signal based upon an electric charge generated in the second photoelectric conversion unit 11b and outputs the signal thus generated.

The addition switch unit 17, which is constituted with a transistor M7 controlled with a signal ADD_FD, connects (couples) the first FD 14a and the second FD 14b with each other. The coupler switch unit 18, which is constituted with a transistor M8 controlled with a signal ADD_SF, connects the first amplifier unit 15a and the second amplifier unit 15b with each other. To describe this in further detail, the coupler switch unit 18 connects the source of the transistor M3a constituting the first amplifier unit 15a with the source of the transistor M3b constituting the second amplifier unit 15b. This may be otherwise described as the region between the first amplifier unit 15a and the first selection unit 16a and the region between the second amplifier unit 15b and the second selection unit 16b connected via the coupler switch unit 18.

In the first control mode, the control unit 4 controls the image sensor 3 so as to set the transistor M7 constituting the addition switch unit 17 in an OFF state and also sets the transistor M8 constituting the coupler switch unit 18 in an OFF state. An electric charge resulting from photoelectric conversion in the first photoelectric conversion unit 11a is transferred by the first transfer unit 12a to the first FD 14a. A signal (first pixel signal) corresponding to the electric charge transferred to the first FD 14a is read out to the first vertical signal line VLa via the first amplifier unit 15a and the first selection unit 16a. In addition, an electric charge resulting from photoelectric conversion in the second photoelectric conversion unit 11b is transferred by the second transfer unit 12b to the second FD 14b. A signal (second pixel signal) corresponding to the electric charge transferred to the second FD 14b is read out to the second vertical signal line VLb via the second amplifier unit 15b and the second selection unit 16b.

In the first control mode described above, the first pixel signal generated in correspondence to the electric charge from the first photoelectric conversion unit 11a is output to the first vertical signal line VLa and the second pixel signal generated in correspondence to the electric charge from the second photoelectric conversion unit 11b is output to the second vertical signal line VLb. The first pixel signal and the second pixel signal undergo signal processing via column circuits and the like as will be explained later, and then are output as a pair of focus detection signals to the control unit 4.

Next, a basic operation executed in the second control mode will be described. In the second control mode, the control unit 4 sets the transistor M7 constituting the addition switch unit 17 in an ON state and also sets the transistor M8 constituting the coupler switch unit 18 in an ON state. In addition, the control unit 4 sets, for instance, the transistor M4a constituting the first selection unit 16a in an ON state and sets the transistor M4b constituting the second selection unit 16b in an OFF state. Electric charges resulting from photoelectric conversion in the first and second photoelectric conversion units 11a and 11b are respectively transferred by the first transfer unit 12a and the second transfer unit 12b. The transferred electric charges are added together at the addition switch unit 17 and accumulated in the first and second FDs 14a and 14b. A sum pixel signal corresponding to the sum of the electric charges added together is generated via the first and second amplifier units 15a and 15b, the coupler switch unit 18 and the first selection unit 16a, and the sum pixel signal is read out to the first vertical signal line VLa.

It is to be noted that if the transistor M4a constituting the first selection unit 16a has been turned off and the transistor M4b constituting the second selection unit 16b has been turned on, the sum pixel signal will be read out to the second vertical signal line VLb in the second control mode.

Processing in the second control mode in the embodiment may be executed through a single-row readout method in which signals are read out in units of individual rows of pixels 10 disposed in a two-dimensional array or through a simultaneous two-row readout method in which signals from two rows are read out simultaneously. The following is an explanation of the "single-row readout method" adopted in the second control mode, given in reference to FIG. 3, and an explanation of the "simultaneous two-row readout method" adopted in the second control mode, given in reference to FIG. 4.

Figure 3:
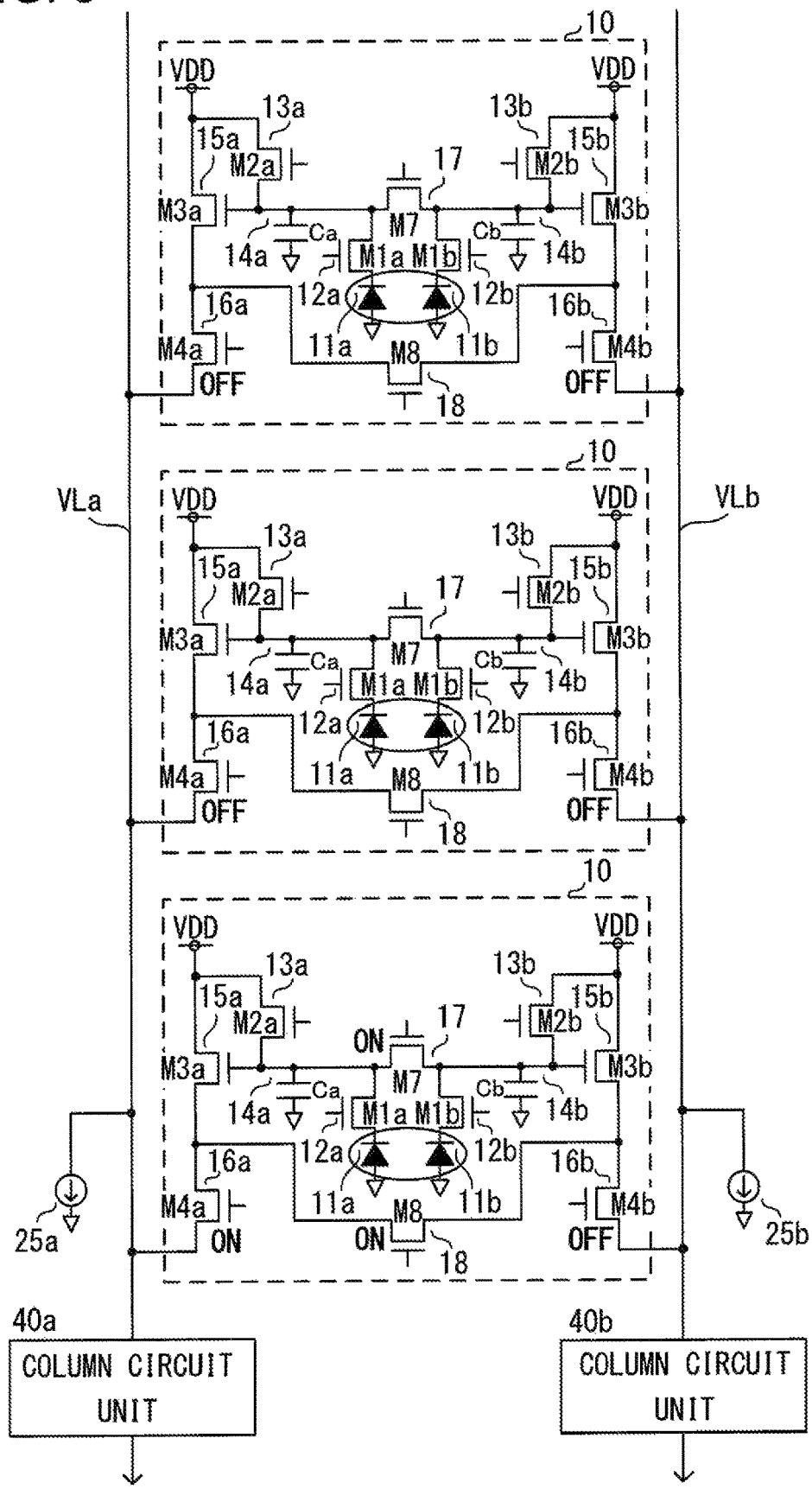

FIG. 3 shows a single column of pixels among the plurality of pixels 10 disposed in a two-dimensional pattern. At the image sensor 3, the first vertical signal line VLa and the second vertical signal line VLb are disposed in correspondence to a column of pixels 10 disposed side-by-side along the column direction, i.e., along the longitudinal direction. In addition, a first electric current source 25a and a first column circuit unit 40a are disposed in correspondence to the first vertical signal line VLa, whereas a second electric current source 25b and a second column circuit unit 40b are disposed in correspondence to the second vertical signal line VLb. It is to be noted that while only one pixel (row direction)×three pixels (column direction) are shown as pixels 10 to simplify the illustration in FIG. 3, the image sensor 3 includes several million pixels to several hundred million pixels, or even a greater number of pixels.

The first electric current source 25a is connected to the individual pixels 10 via the first vertical signal line VLa, whereas the second electric current source 25b is connected to the pixels 10 via the second vertical signal line VLb. The first electric current source 25a and the second electric current source 25b each generate an electric current used to read out signals from the individual pixels. The first electric current source 25a provides the electric current generated therein to the first vertical signal line VLa and the first selection unit 16a and the first amplifier unit 15a in each pixel 10. Likewise, the second electric current source 25b provides the electric current generated therein to the second vertical signal line VLb and the second selection unit 16b and the second amplifier unit 15b in each pixel 10.

The first column circuit unit 40a and the second column circuit unit 40b are each configured so as to include an analog/digital conversion unit (A/D conversion unit). The first column circuit unit 40a converts signals input thereto from the individual pixels 10 via the first vertical signal line VLa to digital signals. The second column circuit unit 40b converts signals input thereto from the individual pixels 10 via the second vertical signal line VLb to digital signals. The first column circuit unit 40a and the second column circuit unit 40b output the digital signals resulting from conversion to a horizontal transfer unit to be explained later.

In the single-row readout method of the second control mode, the image sensor 3 reads out a signal (sum pixel signal) corresponding to an electric charge representing the sum of the electric charge in the first photoelectric conversion unit 11a and the electric charge in the second photoelectric conversion unit 11b added together to, for instance, the first vertical signal line VLa. In the example presented in FIG. 3, in which a sum pixel signal is read out from the pixel 10 in the first row, i.e., the lowermost row, the transistor M7 constituting the addition switch unit 17 is in an ON state and the transistor M8 constituting the coupler switch unit 18 is also in an ON state in the first-row pixel 10. In addition, the transistor M4a constituting the first selection unit 16a is in an ON state but the transistor M4b at the second selection unit 16b is in an OFF state. However, the transistors M4a and M4b in the first and second selection units 16a and 16b in the pixels 10 in other rows, e.g., the second row and the third row, are in an OFF state. It is to be noted that ON in FIG. 3 indicates that the corresponding transistor is in an ON state (connected state, electrically continuous state, or shorted state) and that OFF in FIG. 3 indicates that the corresponding transistor is in an OFF state (disconnected state, discontinuous state, open state or cut-off state).

As the transistor M7 constituting the addition switch 17 in the pixel 10 in the first row enters an ON state, the first FD 14a and the second FD 14b become electrically connected. In addition, the first transfer unit 12a and the second transfer unit 12b, too, become electrically connected. As a result, the electric charge transferred from the first photoelectric conversion unit 11a and the electric charge transferred from the second photoelectric conversion unit 11b are added together. This may be otherwise described as the electric charges generated in the first photoelectric conversion unit 11a and the second photoelectric conversion unit 11b are mixed (combined). The capacitor Ca and the capacitor Cb become electrically connected, the electric charges transferred from the first photoelectric conversion unit 11a and the second photoelectric conversion unit 11b are distributed to the capacitor Ca and the capacitor Cb. The voltage at the first FD 14a and the voltage at the second FD 14b are averaged and input to the first and second amplifier units 15a and 15b. In other words, a voltage, represented by a quotient obtained by dividing the electric charge sum of the electric charge accumulated in the capacitor Ca and the electric charge accumulated in the capacitor Cb by a value representing a capacitance value of the capacitor Ca and the capacitor Cb, is input to the first amplifier unit 15a and to the second amplifier unit 15b individually.

As the transistor M4a constituting the first selection unit 16a enters an ON state, the transistor M4b constituting the second selection unit 16b enters an OFF state and the transistor M8 constituting the coupler switch unit 18 enters an ON state, an electric current from the first electric current source 25a is provided to both the first amplifier unit 15a and the second amplifier unit 15b, thereby engaging them in operation in a saturation region. Since the transistors M3a and M3b constituting the first and second amplifier units 15a and 15b are engaged in operation in the saturation region, the gate capacitances at the first and second amplifier units 15a and 15b both assume a substantially constant capacitance value.

Since the gate capacitances at the first and second amplifier units 15a and 15b assume a substantially constant value as described above, the capacitance at the first FD 14a and the capacitance at the second FD 14b, too, sustain a specific value. Thus, the first amplifier unit 15a and the second amplifier unit 15b each output a signal that is amplified based upon the voltage representing the quotient obtained by dividing the electric charge sum of the electric charge accumulated in the capacitor Ca and the electric charge accumulated in the capacitor Cb by the value representing the combined capacitance value, i.e., the capacitor Ca and the capacitor Cb combined together. The signal from the first amplifier unit 15a and the signal from the second amplifier unit 15b are provided as a sum pixel signal via the first selection unit 16a to the first vertical signal line VLa.

Once the sum pixel signal from the pixel 10 in the first row is read out to the first vertical signal line VLa, pixels in the other rows, e.g., the second row and the third row, are selected in units of individual rows in sequence and sum pixel signals from the pixels 10 are read out to the first vertical signal line VLa at the image sensor 3. The sum pixel signals output to the first vertical signal line VLa from the pixels 10 are first converted to digital signals at the first column circuit unit 40a and are output as image-capturing signals to the control unit 4.

In the example presented in FIG. 3, the sum pixel signals from the pixels 10 in the individual rows are read out to the first vertical signal line VLa. This means that electric current generation in the second electric current source 25b connected to the second vertical signal line VLb, to which no sum pixel signals are read out, can be stopped at the image sensor 3, so as to reduce power consumption in the image sensor 3. It is to be noted that the transistor M4a constituting the first selection unit 16a may be set in an OFF state and the transistor M4b constituting the second selection unit 16b may be set in an ON state so as to read out sum pixel signals from the pixels 10 to the second vertical signal line VLb.

In the embodiment, a conversion gain at which electric charges are converted to voltages via the first and second FDs 14a and 14b, i.e., the reciprocal of the combined capacitance value of the capacitor Ca and the capacitor Cb combined together, assumes a substantially constant value at all times. For this reason, a sum pixel signal is generated as a signal dependent upon the electric charges accumulated in the first FD 14a and the second FD 14b, which assures a high level of linearity. The following is a description of the conversion gain pertaining to the first and second FDs 14a and 14b, which sustains a substantially constant value at all times, given by contrasting it with a comparison example.

In the embodiment, as the transistor M4a and the transistor M8 enter an ON state and the transistor M4b enters an OFF state, the transistors M3a and M3b are both engaged in operation in a saturation region, with an electric current supplied thereto from the first electric current source 25a. As a result, the gate capacitances at the transistors M3a and M3b constituting the first and second amplifier units 15a and 15b both assume a substantially constant capacitance value with substantially no fluctuation. In this situation, the capacitance Ca at the first FD 14a and the capacitance Cb at the second FD 14b, too, sustain a specific value, i.e., a substantially constant value, since there is no fluctuation in the gate capacitances at the transistors M3a and M3b affecting them. Consequently, the conversion gain at the first and second FDs 14a and 14b remains substantially constant at all times. As pixels become more miniaturized, the ratio of the gate capacitance value to the combined capacitance value at the first and second FDs 14a and 14b combined may take a greater value. Even under such circumstances, the gate capacitances do not fluctuate and thus, the linearity of the charge/voltage conversion at the first and second FDs 14a and 14b will remain intact.

Pixels 10 in the comparison example do not include coupler switch units 18, unlike the pixels 10 in FIG. 3. As the transistor M4a constituting the first selection unit 16a is set in an ON state and the transistor M4b constituting the second selection unit 16b is set in an OFF state, an electric current is provided to the first amplifier unit 15a but no electric current is provided to the second amplifier unit 15b. In this state, the second amplifier unit 15b is engaged in operation in a weak inversion region. The gate capacitance at the transistor M3b constituting the second amplifier unit 15b engaged in operation in the weak inversion region fluctuates in response to a signal input to the gate. Such fluctuation in the gate capacitance at the second amplifier unit 15b is bound to cause fluctuations in the capacitances at the first and second FDs 14a and 14b, resulting in a fluctuation in the charge/voltage conversion gain.

Figure 4:
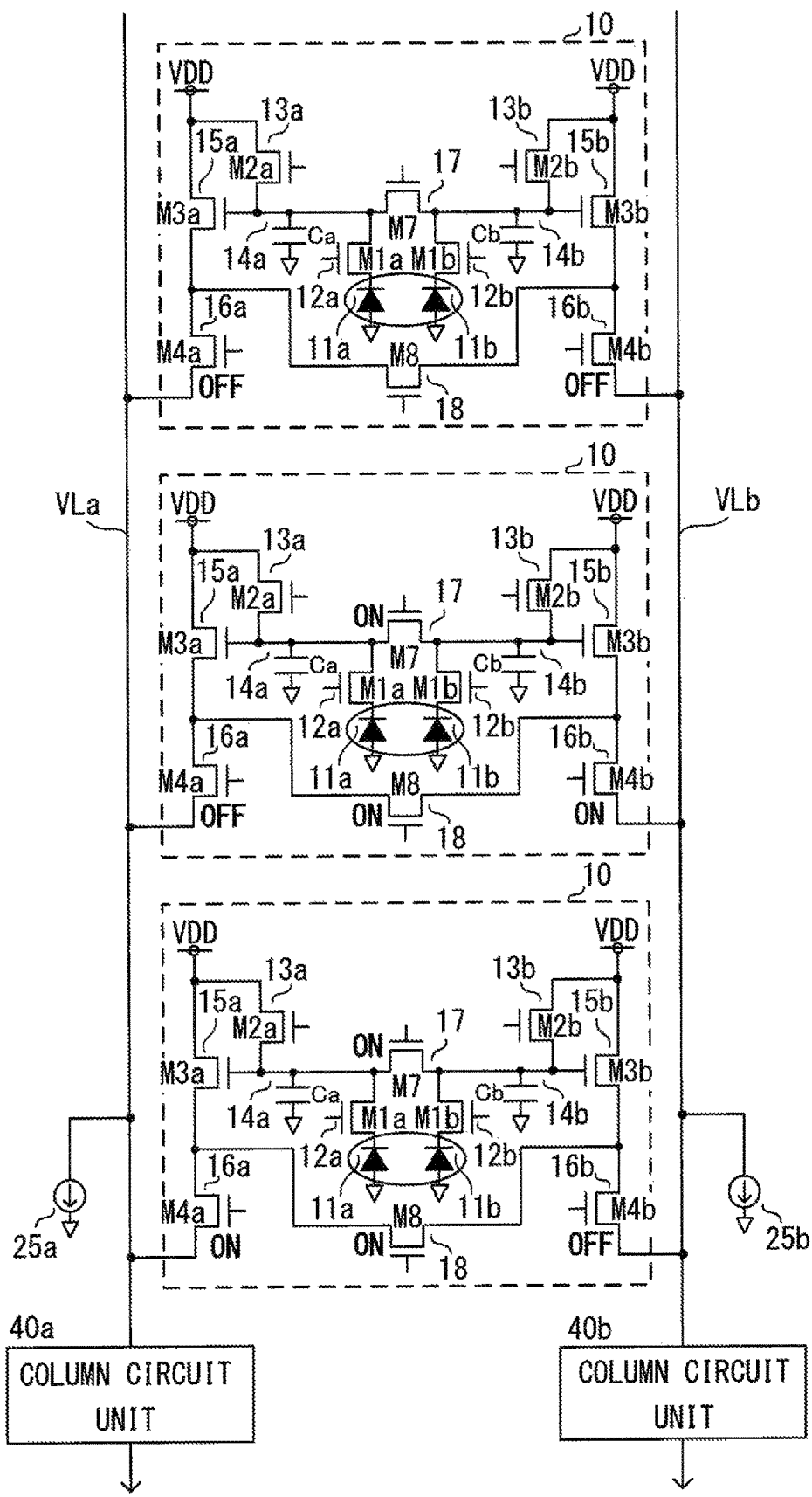

FIG. 4 illustrates the simultaneous two-row readout method adopted in the second control mode. In the simultaneous two-row readout method of the second control mode, a sum pixel signal from a pixel in one of two rows is read out to the first vertical signal line VLa and at the same time, a sum pixel signal from a pixel in the other row is read out to the second vertical signal line VLb. The following is a detailed description.

In the pixel 10 in the first row, i.e., the lowermost row in FIG. 4, the transistor M7 constituting the addition switch unit 17 is in an ON state, the transistor M8 constituting the coupler switch unit 18 is also in an ON state, the transistor M4a constituting the first selection unit 16a, too is in an ON state and the transistor M4b constituting the second selection unit 16b is in an OFF state. In addition, in the pixel 10 in the second row, which is adjacent to the pixel in the first row, the transistor M7 constituting the addition switch unit 17 is in an ON state, the transistor M8 constituting the coupler switch unit 18, too, is in an ON state, the transistor M4a constituting the first selection unit 16a is in an OFF state and the transistor M4b constituting the second selection unit 16b is in an ON state.

In each of the pixels 10 in the first row and the second row, the transistor M7 constituting the addition switch unit 17 is in an ON state and thus, the electric charge transferred from the first photoelectric conversion unit 11a and the electric charge transferred from the second photoelectric conversion unit 11b are added together. In addition, in each pixel 10 in the first row, the first selection switch 16a and the coupler switch unit 18 are in an ON state and thus, an electric current from the first electric current source 25a is provided to the first amplifier unit 15a and the second amplifier unit 15b individually. In addition, in each pixel 10 in the second row, the second selection unit 16b and the coupler switch unit 18 are in an ON state and thus, an electric current from the second electric current source 25b is provided to the first amplifier unit 15a and the second amplifier unit 15b individually. As a result, the transistors M3a and M3b constituting the first and second amplifier units 15a and 15b in each of the pixels 10 in the first row and the second row are engaged in operation in a saturation region, and the gate capacitances at the transistors M3a and M3b both assume a substantially constant value.

A sum pixel signal generated based upon the electric charge sum is read out from the pixel 10 in the first row to the first vertical signal line VLa and at the same time, a sum pixel signal generated based upon the electric charge sum is read out from the pixel 10 in the second row to the second vertical signal line VLb. Once the simultaneous readout from the pixels in the first row and the second row ends, simultaneous readout from the pixels in the third row and the fourth row is executed and further simultaneous readout is executed in sequence from the pixels in subsequent odd-numbered and even-numbered rows adjacent to each other.

As described above, through the simultaneous two-row readout method illustrated in FIG. 4, sum pixel signals from pixels in two rows can be read out simultaneously. This means that signals can be read out at high speed from the individual pixels 10 disposed at the image sensor 3. In addition, in the simultaneous two-row readout method, the transistors M3a and M3b constituting the first and second amplifier units 15a and 15b, provided with an electric current from the first electric current source 25a or the second electric current source 25b, are engaged in operation in a saturation region. As a result, the gate capacitances at the transistors M3a and M3b both assume a substantially constant value, and a sum pixel signal assuring a high level of linearity is generated as a signal dependent upon the electric charges accumulated in the first and second FDs 14a and 14b.

Figure 5:
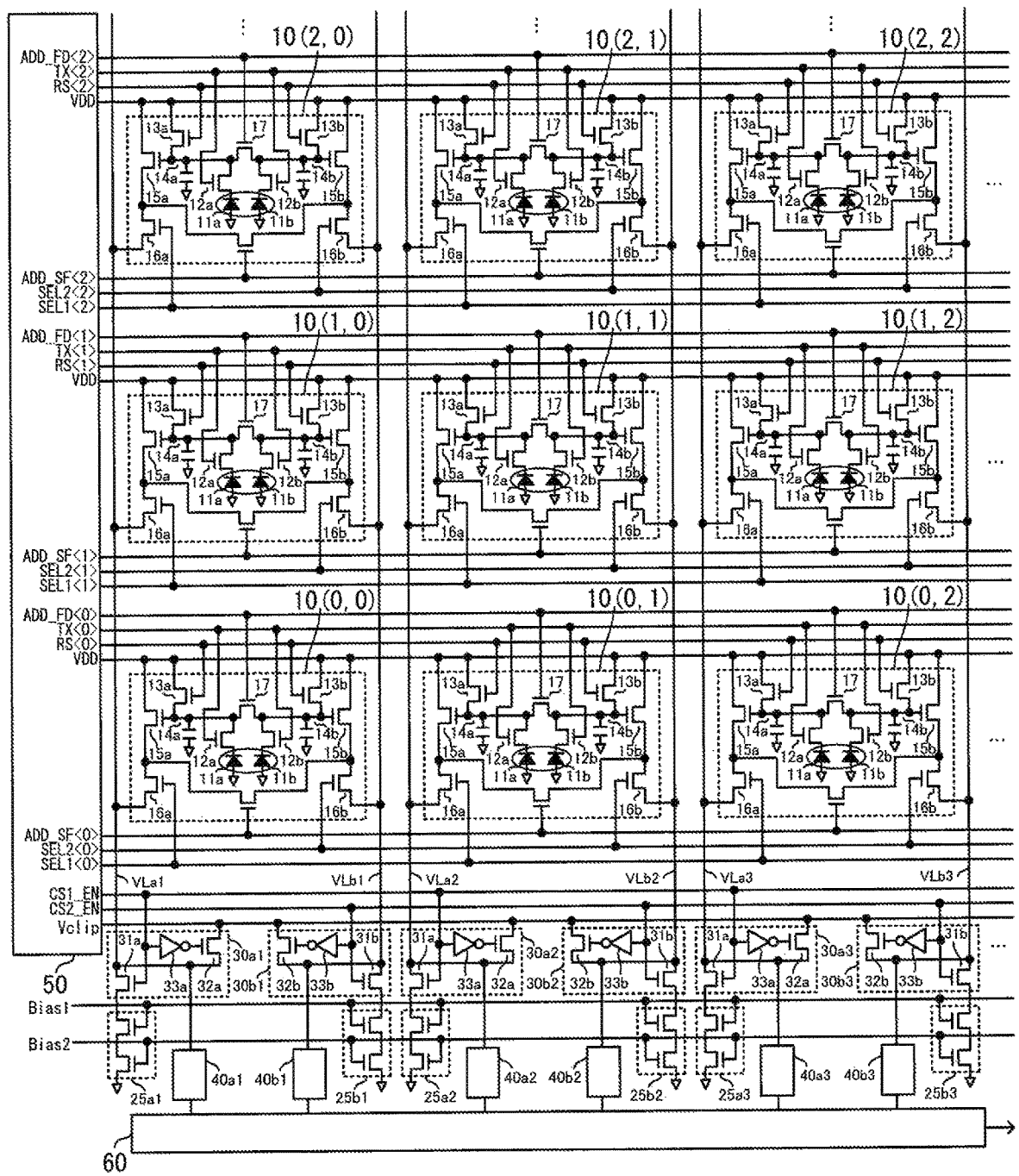
Figure 6:
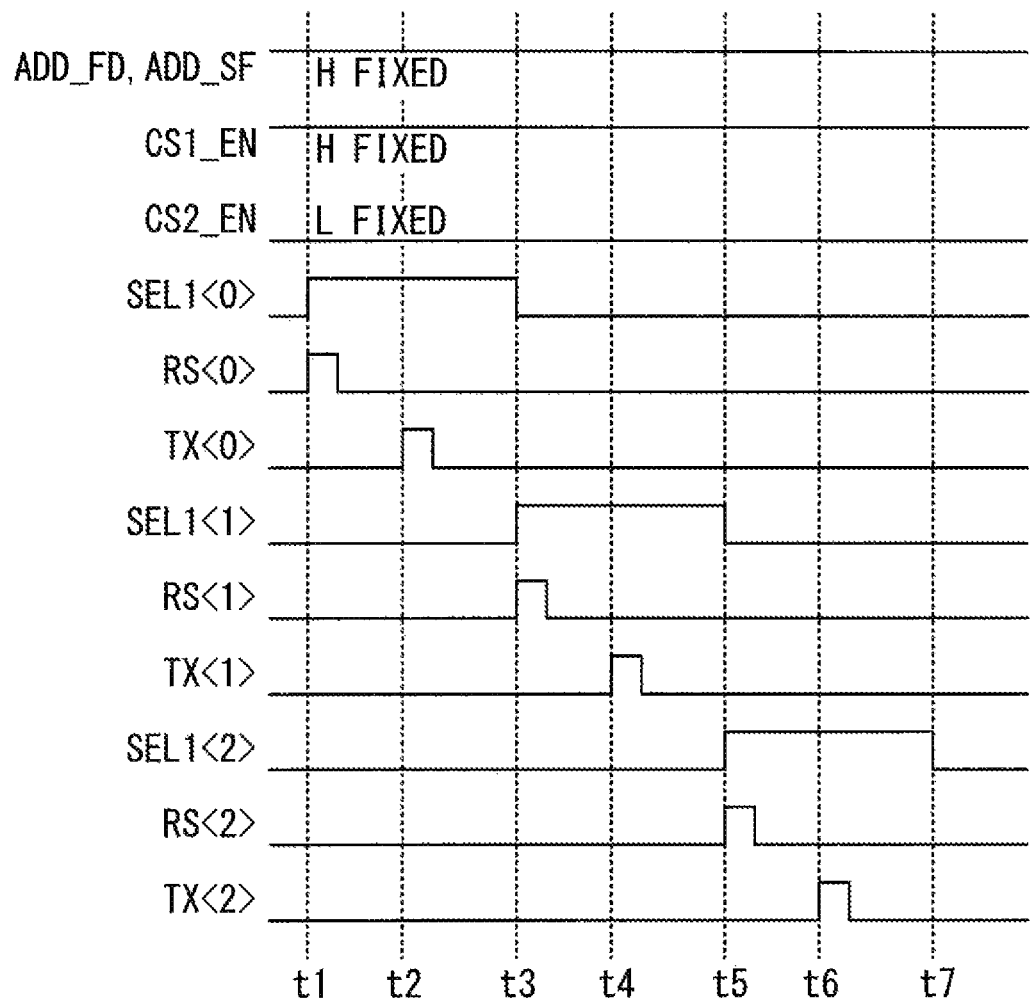
Figure 7:
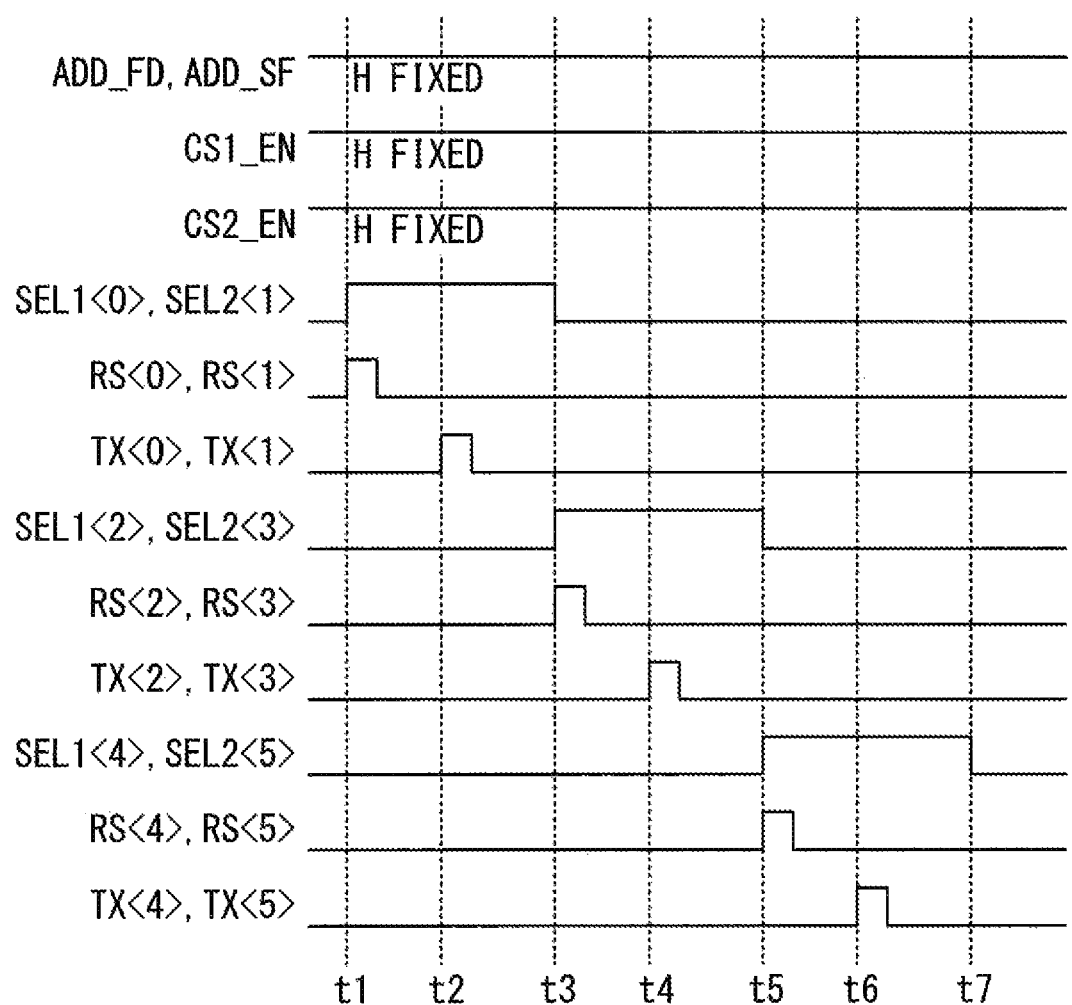

In reference to FIGS. 5 through 7, the circuit structure and the operations of the image sensor 3 in the first embodiment will be described in further detail. FIG. 5 is a circuit diagram illustrating, in detail, the circuit structure of the image sensor 3 in the first embodiment, and shows pixels 10 in a two-dimensional presentation. FIG. 6 is a timing chart of one example of an operation that may be executed in the image sensor 3 in the second control mode through the single-row readout method. FIG. 7 is a timing chart of one example of an operation that may be executed in the image sensor 3 in the second control mode through the simultaneous two-row readout method.

As shown in FIG. 5, the image sensor 3 includes a plurality of pixels 10 disposed in a matrix pattern, first electric current sources 25a (first electric current source 25a1 through first electric current source 25a3) and second electric current sources 25b (second electric current source 25b1 through second electric current source 25b3). The image sensor 3 further includes first electric current control units 30a (first electric current control unit 30a1 through first electric current control unit 30a3) and second electric current control units 30b (second electric current control unit 30b1 through second electric current control unit 30b3). The image sensor 3 also includes first column circuit units 40a (first column circuit unit 40a1 through first column circuit unit 40a3), second column circuit units 40b (second column circuit unit 40b1 through second: circuit unit 40b3), a vertical transfer unit 50 and a horizontal transfer unit 60.

First vertical signal lines VLa (first vertical signal line VLa1 through first vertical signal line VLa3) and second vertical signal lines VLb (second vertical signal line VLb1 through second vertical signal line VLb3) are each disposed in correspondence to a column of pixels 10. A first electric current source 25a, a first electric current control unit 30a and a first column circuit unit 40a are disposed in conjunction with a first vertical signal line VLa. In addition, a second electric current source 25b, a second electric current control unit 30b and a second column circuit unit 40b are disposed in conjunction with a second vertical signal line VLb. It is to be noted that the example of FIG. 5 simply shows three pixels 10 (across)×three pixels 10 (down) so as to simplify the illustration. Among the plurality of pixels 10 (0, 0) through (2, 2) shown in FIG. 5, the pixel 10 in the lower left position is designated as the first row/first column pixel 10 (0, 0). The first electric current sources 25a and the second electric current sources 25b are each configured with for instance, two transistors connected in cascode connection and generate an electric current based upon a bias voltage (voltage Bias1, voltage Bias2).

The vertical transfer unit 50 controls the various pixels 10 by providing a signal TX, a signal RS, a signal SEL1, a signal SEL2, a signal ADD_FD, a signal ADD_SF and a source voltage VDD to the individual pixels 10. The first electric current control units 30a each include switch units 31a, 32a and an inverter unit 33a, whereas the second electric current control units 30b each include switch units 31b, 32b and an inverter unit 33b. The vertical transfer unit 50 provides a signal CS1_EN, a signal CS2_EN and a voltage Vclip to the first electric current control units 30a and the second electric current control units 30b. It is to be noted that in the example presented in FIG. 5, the first transfer unit 12a and the second transfer unit 12b in a pixel 10 are controlled with the same signal TX and that the first reset unit 13a and the second reset unit 13b in a pixel 10 are controlled with the same signal RS.

The horizontal transfer unit 60 sequentially transfers digital signals resulting from conversion at the first column circuit units 40a and the second column circuit units 40b to a signal processing unit (not shown). The signal processing unit executes signal processing such as correlated double sampling and signal level correction on signals input thereto from the horizontal transfer unit 60 and outputs signals having undergone the signal processing to the control unit 4 of the camera 1.

The timing chart in FIG. 6, with time points indicated along the horizontal axis, shows control signals input to the various components of the image sensor 3 in FIG. 5 in the single-row readout method of the second control mode. In addition, when a control signal is at high level (e.g., the source potential), the transistor to which the control signal is input enters an ON state and when a control signal is at low level (e.g., the ground potential), the transistor to which the control signal is input enters an OFF state in FIG. 6.

The vertical transfer unit 50 sets the signal ADD_FD and the signal ADD_SF to high level to set the second control mode. With the signal ADD_FD set to high level, the first FD 14a and the second FD 14b in each pixel 10 become electrically connected. In addition, with the signal ADD_SF set to high level, the first amplifier unit 15a and the second amplifier unit 15b in each pixel 10 become electrically connected.

The signal CS1_EN is set to high level and the signal CS2_EN is set to low level. With the signal CS1_EN set to high level, the switch units 31a in the first electric current control units 30a enter an ON state, whereas the switch units 32a enter an OFF state in response to a low level signal input thereto via the inverter units 33a in the first electric current control units 30a. As a result, electric currents are provided from the first electric current sources 25a to the first vertical signal lines VLa via the switch units 31a.

With the signal CS2_EN set to low level, the switch units 31b enter an OFF state and the switch units 32b enter an ON state in the second electric current control units 30b. As a result, electric current supply from the second electric current sources 25b to the second vertical signal lines VLb stops and the voltage Vclip is instead provided to the second vertical signal lines VLb via the switch units 32b. The second vertical signal lines VLb enter a state in which their voltages are fixed at a predetermined level and they are thus prevented from entering a floating state. It is to be noted that since electric currents are provided from the first electric current sources 25a to the second amplifier units 15b via the first selection units 16a and the coupler switch units 18, the second amplifier units 15b are not engaged in operation in a weak inversion region.

At a time point t1 in FIG. 6, the signal RS<0> shifts to high level, thereby turning on the transistors M2a and M2b constituting the first and second reset units 13a and 13b and setting the potentials at the first and second FDs 14a and 14b to a reset potential in the pixels 10 (0, 0) through 10 (0, 2) in the first row. In this situation, since the first FD 14a and the second FD 14b in each of these pixels 10 are connected as explained earlier, the potentials at the first and second FDs 14a and 14b are averaged.

In addition, at the time point t1, the signal SEL1<0> shifts to high level, resulting in a signal generated based upon the reset potential being output to the first vertical signal line VLa via the first and second amplifier units 15a and 15b and the first selection unit 16a. Namely, a signal (noise signal) generated when the potentials at the first and second FDs 14a and 14b are reset to the reset potential, is read out to the corresponding first vertical signal line VLa. The noise signals from the individual pixels 10 in the first row output to the first vertical signal lines VLa are individually input to the first column circuit units 40a1 through 40a3 where they are converted to digital signals.

At a time point t2, the signal TX<0> shifts to high level, thereby setting the transistors M1a and M1b constituting the first and second transfer units 12a and 12b in an ON state, and thus, electric charges resulting from photoelectric conversion in the first and second photoelectric conversion units 11a and 11b are transferred to the first and second FDs 14a and 14b. In this situation, since the first FD 14a and the second FD 14b in each pixel are connected, the electric charges transferred from the two photoelectric conversion units are distributed to the capacitor Ca and the capacitor Cb.

In addition, at the time point t2, the signal SEL1<0> is at high level, and thus, a sum pixel signal is output via the first and second amplifier units 15a and 15b and the first selection unit 16a to the corresponding first vertical signal line VLa. The sum pixel signals from the individual pixels 10 in the first row, output to the first vertical signal lines VLa, are individually input to the first column circuit units 40a1 through 40a3 where they are converted to digital signals. The noise signals and the sum pixel signals having been converted to digital signals are input to the signal processing unit via the horizontal transfer unit 60. The signal processing unit executes correlated double sampling in which differential processing for the noise signal and the sum pixel signal from each pixel 10 is performed.

During a time period elapsing between a time point t3 and a time point t5, noise signals and sum pixel signals from the pixels in the second row are read out in the same way as the noise signal readout and the sum pixel readout executed during the time period elapsing between the time point t1 and the time point t3. During a time period elapsing between the time point t5 and a time point t7, noise signals and sum pixel signals from the pixels in the third row are read out in the same way as the noise signal readout and the sum pixel readout executed during the time period elapsing between the time point t1 and the time point t3. Through the single-row readout method described in reference to FIG. 6, pixels 10 are sequentially selected in units of individual rows, signals generated via the two photoelectric conversion units in each pixel 10 are added together and the resulting sum pixel signal can be read out to a first vertical signal line VLa. In addition, since the electric current supply from the second electric current sources 25b is stopped, the power consumption in the image sensor 3 can be reduced.

The timing chart in FIG. 7, with time points indicated along the horizontal axis, shows control signals input to the various components of the image sensor 3 in FIG. 5 in the simultaneous two-row readout method of the second control mode. As in the single-row readout method shown in FIG. 6, the vertical transfer unit 50 sets the signal ADD_FD and the signal ADD_SF to high level. In addition, with the signal CS1_EN set at high level, electric currents from the first electric current sources 25a are provided to the first vertical signal lines VLa. In the simultaneous two-row readout method in FIG. 7, the signal CS2_EN is also set to high level. As the signal CS2_EN is set to high level, the switch units 31b in the second electric current control unit 30b enter an ON state. As a result, electric currents from the second electric current sources 25b are provided to the second vertical signal lines VLb via the switch units 31b.

At a time point t1, the signals RS<0> and RS<1> shift to high level, thereby setting the transistors M2a and M2b, constituting the first and second reset units 13a and 13b in the pixels in the first row and the pixels in the second row (pixels 10 (0, 0) through 10 (1, 2)), in an ON state. As a result, the potentials at the first and second FDs 14a and 14b are all set to the reset potential. In addition, since the first FD 14a and the second FD 14b in each pixel are connected, the potentials at the first and second FDs 14a and 14b are averaged.

Furthermore, at the time point t1, the signal SEL1<0> shifts to high level and thus, averaged noise signals from the pixels 10 in the first row are output to the first vertical signal lines VLa. The noise signals from the individual pixels 10 in the first row are input to the first column circuit units 40a1 through 40a3 where they are converted to digital signals. At the time point t1, the signal SEL2<1> also shifts to high level, and thus, averaged noise signals from the pixels 10 in the second row are output to the second vertical signal lines VLb. The noise signals from the individual pixels 10 in the second row are input to the second column circuit units 40b1 through 40b3 where they are converted to digital signals.

At a time point t2, the signal TX<0> shifts to high level, thereby setting the transistors M1a and M1b constituting the first and second transfer units 12a and 12b in the pixels 10 in the first row in an ON state and causing electric charges in the first and second photoelectric conversion units 11a and 11b to be transferred to the first and second FDs 14a and 14b. In addition, at the time point t2, the signal TX<1> shifts to high level, causing electric charges in the first and second photoelectric conversion units 11a and 11b in the pixels 10 in the second row to be transferred to the first and second FDs 14a and 14b. In this situation, since the first FD 14a and the second FD 14b are connected in each of the pixels 10 in the first row and the second row, the electric charges transferred from the two photoelectric conversion units are distributed to the corresponding capacitor Ca and capacitor Cb.

Furthermore, at the time point t2, the signal SEL1<0> and the signal SEL2<1> are at high level and thus, sum pixel signals from the pixels 10 in the first row are output to the first vertical signal lines VLa and sum pixel signals from the pixels 10 in the second row are output to the second vertical signal lines VLb. The sum pixel signals output from the individual pixels 10 in the first row to the first vertical signal lines VLa are input to the corresponding first column circuit units 40a1 through 40a3 where they are converted to digital signals. The sum pixel signals output from the individual pixels 10 in the second row to the second vertical signal lines VLb are input to the corresponding second column circuit units 40b1 through 40b3 where they are converted to digital signals.

During a time period elapsing between a time point 13 and a time point t5, signal readout from the pixels in the third row and signal readout from the pixels in the fourth row are executed simultaneously in the same way as the signal readout executed during the time period elapsing between the time point t1 and the time point t3. During a time period elapsing between the time point t5 and a time point t7, signal readout from the pixels in the fifth row and signal readout from the pixels in the sixth row are executed simultaneously in the same way as the signal readout executed during the time period elapsing between the time point t1 and the time point t3. As described above, signals from the pixels in two rows can be read out simultaneously through the simultaneous two-row readout method shown in FIG. 7. As a result, signals can be read out at high speed from the individual pixels 10 disposed in the image sensor 3.

Next, different operations executed by selecting the first control mode, by selecting the single-row readout method of the second control mode and by selecting the simultaneous two-row readout method of the second control mode will be explained. When the camera 1 is engaged in focusing operation, the control unit 4 controls the image sensor 3 in the first control mode. In addition, when a live view image of the subject is brought up on display at the display unit 6 of the camera 1, the control unit 4 controls the image sensor 3 in the single-row readout method of the second control mode or in the simultaneous two-row readout method of the second control mode. Accordingly, when the camera 1 executes a focusing operation while displaying a live view image of the subject at the display unit 6, the control unit 4 controls the image sensor 3 in the single-row readout method of the second control mode or in the simultaneous two-row readout method of the second control mode and also controls the image sensor 3 in the first control mode through timesharing. In response to an operation performed at a shutter release operation member in the operation unit 7, the control unit 4 controls the image sensor 3 in the single-row readout method of the second control mode or in the simultaneous two-row readout method of the second control mode.

movie shooting operation, the control unit 4 controls the image sensor 3 in the simultaneous two-row readout method of the second control mode so as to read out sum pixel signals at high speed. When a subject motion speed detection unit included in the camera 1 detects that the subject is moving at relatively high speed, too, the control unit 4 controls the image sensor 3 in the simultaneous two-row readout method of the second control mode so as to lower the extent of image blur by reading out sum pixel signals at high speed. If, on the other hand, a battery power detection unit detects that the remaining power in the battery used to drive the camera 1 has become low, the control unit 4 controls the image sensor 3 in the single-row readout method of the second control mode so as to use less battery power.

The following advantages and operations are achieved through the embodiment described above.

(1) The image sensor 3 comprises pixels 10, each having a first photoelectric conversion unit 11a and a second photoelectric conversion unit 11b that generate electric charges through photoelectric conversion of light having entered therein, a first accumulation unit (a first FD 14a) that accumulates the electric charge generated in the first photoelectric conversion unit 11a, a second accumulation unit (a second FD 14b) that accumulates the electric charge generated in the second photoelectric conversion unit 11b, a first output unit (a first amplifier unit 15a and a first selection unit 16a) that generates a signal based upon the electric charge generated in the first photoelectric conversion unit 11a and outputs the signal thus generated, a second output unit (a second amplifier unit 15b and a second selection unit 16b) that generates a signal based upon the electric charge generated in the second photoelectric conversion unit 11b and outputs the signal thus generated, a first connection unit (a coupler switch unit 18) disposed between the first output unit and the second output unit and a second connection unit (an addition switch unit 17) having a second switch that electrically connects/disconnects the first photoelectric conversion unit 11a to/from the second photoelectric conversion unit 11b; and a first signal line (a first vertical signal line VLa) connected with the first output unit, to which the signal from the first output unit is output. In the embodiment, the fluctuation in the gate capacitance at the second amplifier unit 15b is suppressed by connecting the first amplifier unit 15a and the second amplifier unit 15b via the coupler switch unit 18. This, in turn, makes it possible to suppress fluctuation of the charge/voltage conversion gain. As a result, a sum pixel signal with a high level of linearity can be obtained.

(2) The image sensor 3 further comprises a control unit (a vertical transfer unit 50). The control unit sets a first selection switch (the first selection unit 16a) and the first connection unit (the coupler switch unit 18) in a connected state and sets a second selection switch (the second selection unit 16b) in a disconnected state, so as to output the signals from the first output unit and the second output unit to the first signal line (the first vertical signal line VLa) via the first selection switch (the first selection unit 16a). In the embodiment, an electric current from a first electric current source 25a is provided to the second amplifier unit 15b by setting a transistor M8 constituting the coupler switch unit 18 in an ON state. This, in turn, makes it possible to sustain the gate capacitance at the second amplifier unit 15b at a substantially constant level by engaging a transistor M3b constituting the second amplifier unit 15b in operation in a saturation region. As a result, fluctuation of the charge/voltage conversion gain can be suppressed.

Second Embodiment

Figure 8:
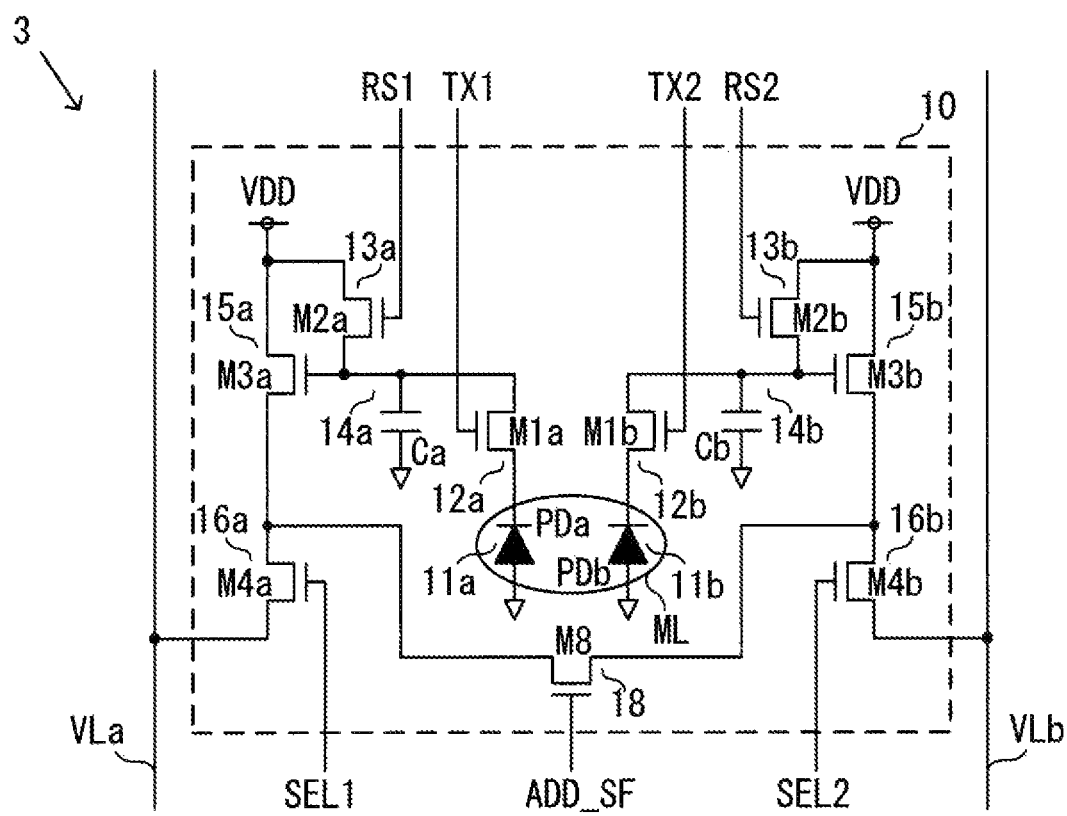

In reference to FIG. 8, the image sensor in the second embodiment will be described. FIG. 8 is a circuit diagram showing the structure adopted in pixels 10 at an image sensor 3 in the second embodiment. The pixels 10 in the first embodiment each include an addition switch unit 17 as illustrated in FIG. 2 and the like. The structure adopted in the pixels 10 in the second embodiment does not include an addition switch unit 17, as shown in FIG. 8. Other structural features are identical to those in the first embodiment.

In the first control mode, the transistor M8 constituting the coupler switch unit 18 is set in an OFF state and an operation similar to that described in reference to the first embodiment is executed. Namely, an electric charge resulting from photoelectric conversion in the first photoelectric conversion unit 11a is transferred to the first FD 14a and an electric charge resulting from photoelectric conversion in the second photoelectric conversion unit 11b is transferred to the second FD 14b. Then, a first pixel signal generated based upon the electric charge from the first photoelectric conversion unit 11a is output to the first vertical signal line VLa and a second pixel signal generated based upon the electric charge from the second photoelectric conversion unit 11b is output to the second vertical signal line VLb.

In the second control mode, the transistor M8 constituting the coupler switch unit 18 is set in an ON state, thereby connecting the first amplifier unit 15a and the second amplifier unit 15b with each other. As a result, a sum pixel signal generated by adding together and averaging a signal from the first amplifier unit 15a and a signal from the second amplifier unit 15b is output to, for instance, a first vertical signal line VL1. The sum pixel signal output to the first vertical signal line VL1 is a signal corresponding to the average of a signal generated by the first amplifier unit 15a based upon the potential at the first FD 14a and a signal generated by the second amplifier unit 15b based upon the potential at the second FD 14b.

In the embodiment described above, the signals provided from two photoelectric conversion units are added together and the resulting signal is output to a vertical signal line by connecting the first amplifier unit 15a and the second amplifier unit 15b via the coupler switch unit 18. The signals from the first amplifier unit 15a and the second amplifier unit 15b are added together (combined) at the sources of the transistors M3a and M3b constituting the first amplifier unit 15a and the second amplifier unit 15b. This means that the need for an addition switch unit 17 via which the electric charges from the two photoelectric conversion units are added together and a wiring to be connected to the addition switch unit 17 is eliminated and, as a result, the number of elements and the number of wirings to be disposed in each pixel 10 can be reduced. Consequently, further miniaturization of pixels can be achieved and furthermore, the chip area of the image sensor can be reduced. In addition, the area taken by the photoelectric conversion units does not need to be reduced due to the presence of numerous elements and the like disposed inside the pixel.

Moreover, since the conversion gain in the embodiment is equal to the reciprocal of the capacitance value at a single FD, a greater value can be realized for the conversion gain, in comparison to a conversion gain equal to the reciprocal of the value representing the combination of capacitances at two FDs. As a result, noise entering the sum pixel signal can be reduced in relative terms, which, in turn, makes it possible to improve the S/N ratio.

Third Embodiment

Figure 9:
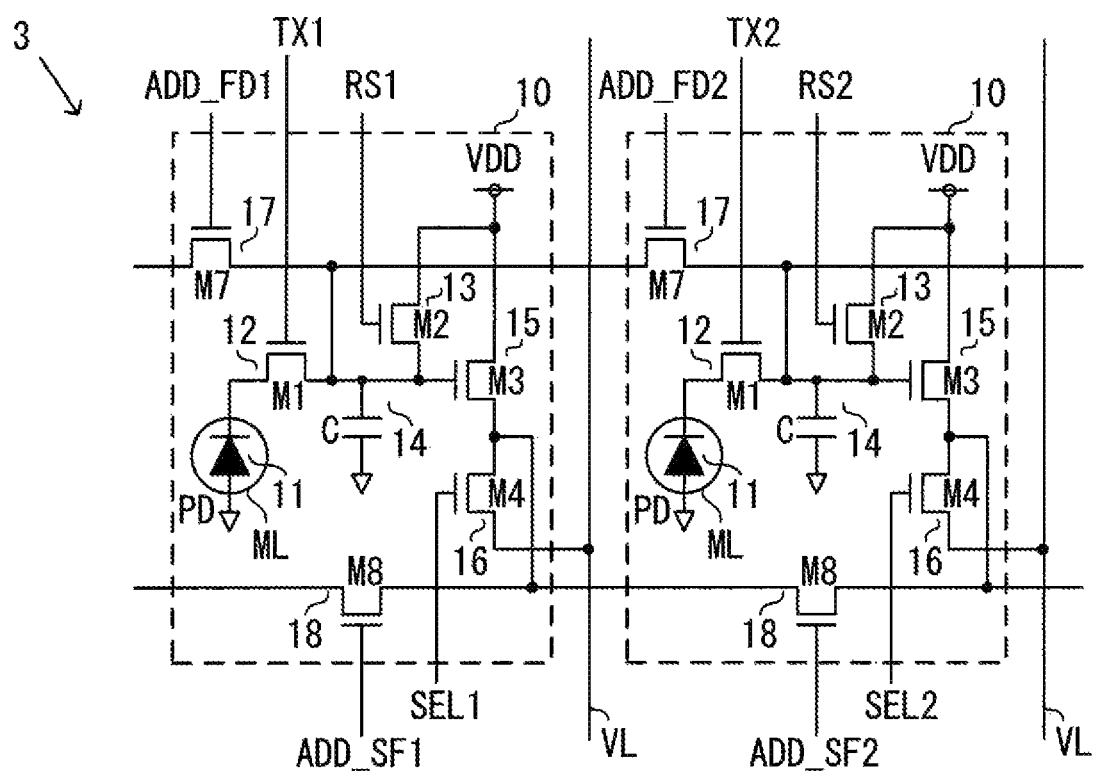

In reference to FIG. 9, the image sensor in the third embodiment will be explained. FIG. 9 is a conceptual diagram presenting an example of a structure that may be adopted in the pixels in an image sensor 3 in the third embodiment. In the example described in reference to the first embodiment, the pixels 10 each include a plurality of photoelectric conversion units disposed therein. The pixels 10 in the third embodiment each include a single photoelectric conversion unit, as shown in FIG. 9. Other structural features are identical to those in the first embodiment.

The pixels 10 each include a microlens ML, a photoelectric conversion unit 11, a transfer unit 12, a reset unit 13, a floating diffusion (FD) 14, an amplifier unit 15, a selection unit 16, an addition switch unit 17 and a coupler switch unit 18. The microlens ML condenses light, having entered via the image-capturing optical system 2, onto the photoelectric conversion unit 11. The photoelectric conversion unit 11 is disposed in correspondence to a single microlens ML. The FDs 14 in a plurality of pixels 10 disposed one after another along, for instance, the row direction, are connected via the addition switch units 17, whereas the amplifier units 15 in the plurality of pixels 10 disposed one after another along the row direction are connected with one another via the coupler switch units 18.

The control unit 4 in the embodiment selects the first control mode when, for instance, a still image photographing operation is executed so as to separately read out signals from the individual pixels 10 in the image sensor 3, whereas it selects the second control mode when executing a movie shooting operation so as to read out signals each generated by adding together signals from a plurality of pixels 10. In the first control mode, the control unit 4 sets the transistor M7 constituting the addition switch unit 17 in an OFF state and also sets the transistor M8 constituting the coupler switch unit 18 in an OFF state in each pixel 10 by controlling the image sensor 3. An electric charge resulting from photoelectric conversion in the photoelectric conversion unit 11 is transferred, via the transfer unit 12, to the FD 14 in each pixel 10. Then, a pixel signal corresponding to the electric charge transferred to the FD 14 is read out to a vertical signal line VL via the amplifier unit 15 and the selection unit 16. In other words, pixel signals from the individual pixels are separately and independently read out to vertical signal lines VL in the first control mode.

In the second control mode, the control unit 4 sets the addition switch units 17 and the coupler switch units 18 in an ON state so that electric charges resulting from photoelectric conversion in the photoelectric conversion units of the individual pixels 10 are added together. Then, a sum pixel signal is generated via the amplifier units 15, the selection units 16 and the coupler switch units 18, in correspondence to the sum of the electric charges added together and the sum pixel signal thus generated is read out to a vertical signal line VL. The following is an explanation of the single-row readout method of the second control mode, given in reference to FIG. 10 and FIG. 11, and an explanation of the simultaneous two-row readout method of the second control mode, given in reference to FIG. 10 and FIG. 12.

Figure 10:
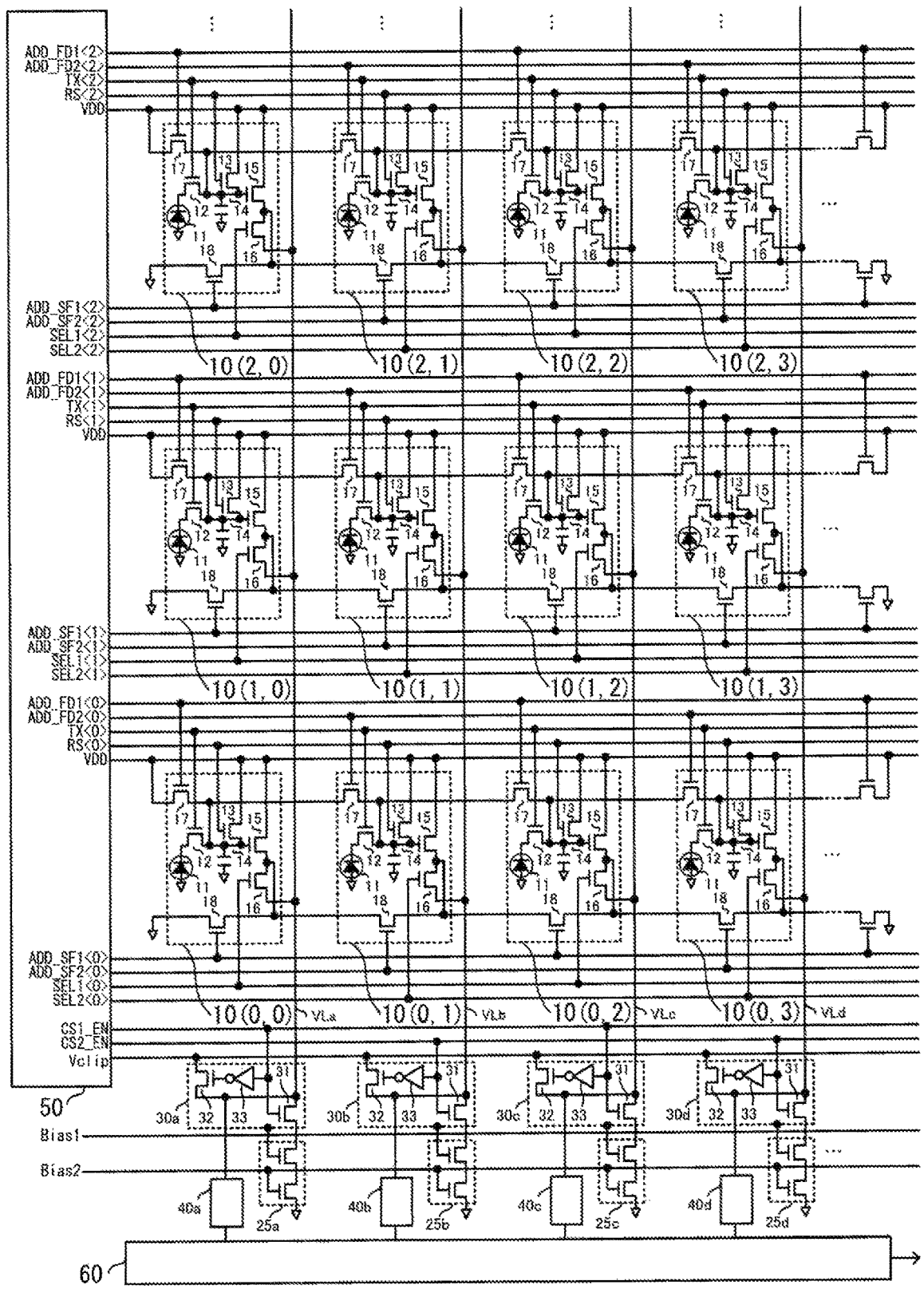
Figure 11:
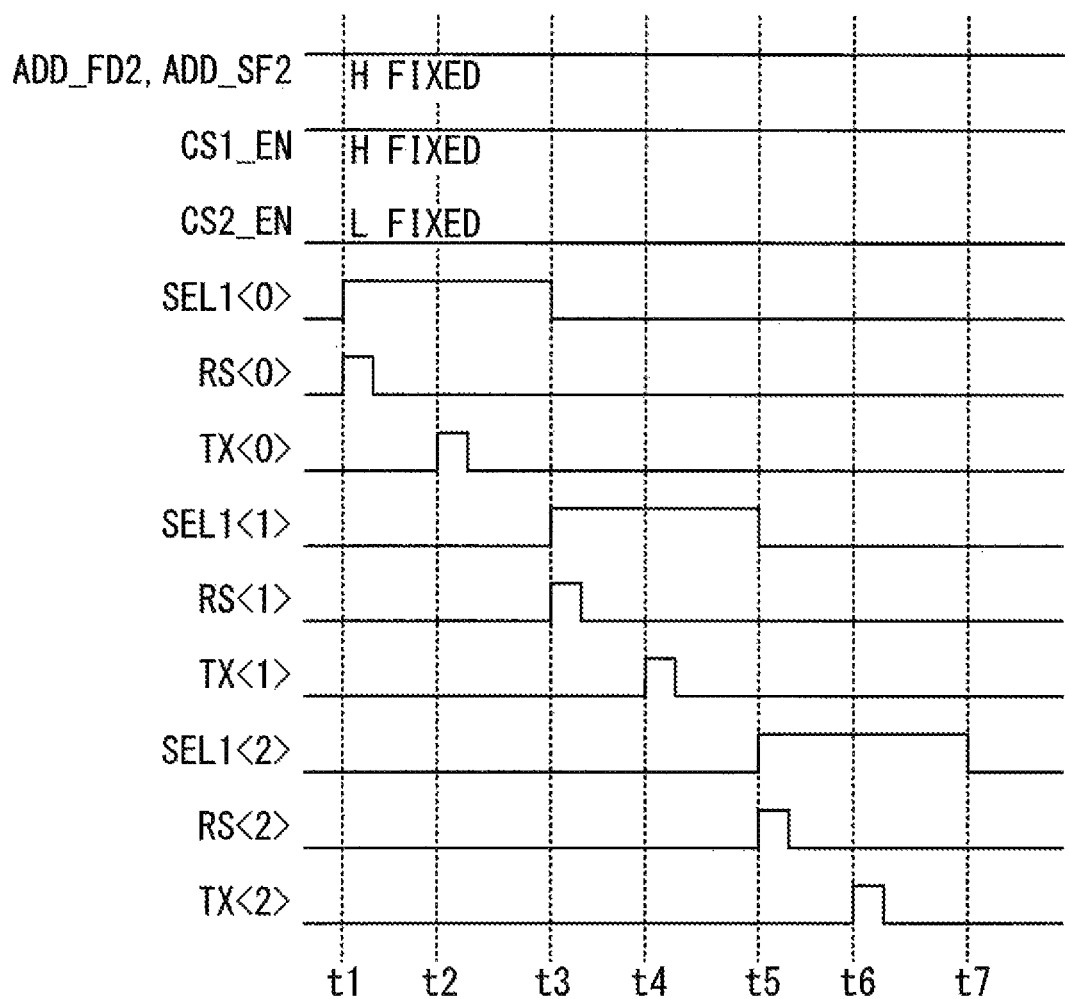
Figure 12:
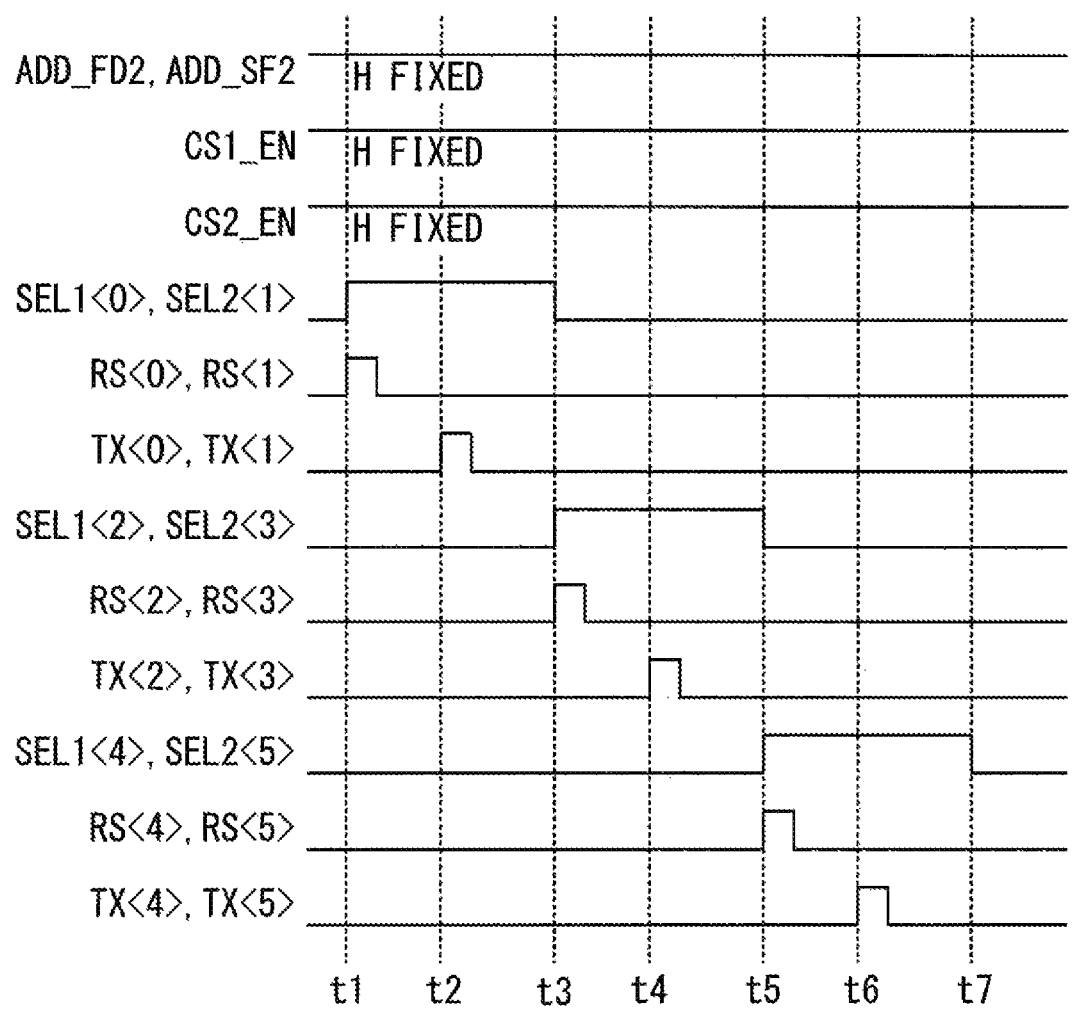

FIG. 10 is a circuit diagram illustrating the structure assumed in part of the image sensor in the third embodiment in an abridged presentation. FIG. 11 is a timing chart pertaining to one example of an operation that may be executed in the image sensor 3 in the single-row readout method of the second control mode. FIG. 12 is a timing chart pertaining to one example of an operation that may be executed in the image sensor 3 in the simultaneous two-row readout method of the second control mode. It is to be noted that FIG. 10 only shows four pixels 10 (across)×three pixels 10 (down) so as to simplify the illustration. Among the plurality of pixels 10 (0, 0) through 10 (2, 3) shown in FIG. 10, the pixel 10 in the lower left position is designated as the first row/first column pixel 10 (0, 0).

As shown in FIG. 10, the image sensor 3 includes a plurality of pixels 10 disposed in a matrix pattern, electric current sources 25 (electric current source 25a through electric current source 25d), electric current control units 30 (electric current control unit 30a through electric current control unit 30b), column circuit units 40 (column circuit unit 40a through column circuit unit 40d), a vertical transfer unit 50 and a horizontal transfer unit 60. Vertical signal lines VL (vertical signal line VLa through vertical signal line VLd) are disposed each in correspondence to a single column of pixels 10. An electric current source 25, an electric current control unit 30 and a column circuit unit 40 are disposed in correspondence to a vertical signal line VL.

In the single-row readout method shown in FIG. 11, the vertical transfer unit 50 sets the signal ADD_FD2 and the signal ADD_SF2 to high level. It is to be noted that the signal ADD_FD1 and the signal ADD_SF1 are both set to low level. With the signal ADD_FD2 set to high level, the FD 14 in the pixel 10 (0, 0) and the FD 14 in the pixel 10 (0, 1) become electrically connected and the FD 14 in the pixel 10 (0, 2) and the FD 14 in the pixel 10 (0, 3) become electrically connected. In addition, the FD 14 in the pixel 10 (1, 0) and the FD 14 in the pixel 10 (1, 1) become electrically connected and the FD 14 in the pixel 10 (1, 2) and the FD 14 in the pixel 10 (1, 3) become electrically connected. The FD 14 in the pixel 10 (2, 0) and the FD 14 in the pixel 10 (2, 1) become electrically connected and the FD 14 in the pixel 10 (2, 2) and the FD 14 in the pixel 10 (2, 3) become electrically connected, as well.

With the signal ADD_SF2 set to high level, the amplifier unit 15 in the pixel 10 (0, 0) and the amplifier unit 15 in the pixel 10 (0, 1) become electrically connected and the amplifier unit 15 in the pixel 10 (0, 2) and the amplifier unit 15 in the pixel 10 (0, 3) are also electrically connected. In addition, the amplifier unit 15 in the pixel 10 (1, 0) and the amplifier unit 15 in the pixel 10 (1, 1) become electrically connected and the amplifier unit 15 in the pixel 10 (1, 2) and the amplifier unit 15 in the pixel 10 (1, 3) also become electrically connected. The amplifier unit 15 in the pixel 10 (2, 0) and the amplifier unit 15 in the pixel 10 (2, 1) become electrically connected and the amplifier unit 15 in the pixel 10 (2, 2) and the amplifier unit 15 in the pixel 10 (2, 3) become electrically connected, as well.

The signal CS1_EN is set to high level and the signal CS2_EN is set to low level. With the signal CS1_EN set to high level, switch units 31 in the electric current control units 30a and 30c each enter an ON state. As a result, electric currents are provided to the vertical signal lines VLa and VLc respectively from the electric current sources 25a and 25c. In addition, with the signal CS2_EN set to low level, the switch units 31 in the electric current control units 30b and 30d each enter an OFF state and switch units 32 in the electric current control units 30b and 30d enter an ON state. A voltage Vclip is thus provided individually to the vertical signal lines VLb and VLd.

At a time point t1 in FIG. 11, the signal RS<0> shifts to high level, thereby setting transistors M2 constituting the reset units 13 in the pixel 10 (0, 0) through the pixel 10 (0, 3) in the first row in an ON state and thus setting the potentials at the FDs 14 to the reset potential. In this situation, the potentials at the FDs 14 in the pixel 10 (0, 0) and the pixel 10 (0, 1), which are electrically connected, are averaged. In addition, the potentials at the FDs 14 in the pixel 10 (0, 2) and the pixel 10 (0, 3), which are electrically connected, are averaged.

Also at the time point t1, the signal SEL1<0> shifts to high level, and in response, a noise signal generated by averaging signals from the two pixels 10 (0, 0) and 10 (0, 1) is output to the vertical signal line VLa via the selection unit 16 in the pixel 10 (0, 0). A noise signal generated by averaging signals from the two pixels 10 (0, 2) and 10 (0, 3) is output to the vertical signal line VLc via the selection unit 16 in the pixel 10 (0, 2). The noise signals from the pixels 10 in the first row, having been output to the vertical signal lines VLa and VLc, are respectively input to the column circuit units 40a and 40c where they are converted to digital signals.

At a time point t2, the signal TX<0> shifts to high level, thereby setting transistors M1 constituting the transfer units 12 in the pixel 10 (0, 0), the pixel 10 (0, 1), the pixel 10 (0, 2) and the pixel 10 (0, 3) in an ON state, thus causing electric charges resulting from photoelectric conversion in the photoelectric conversion units 11 to be transferred to the FDs 14. Under these circumstances, the electric charges transferred from the photoelectric conversion units 11 in the pixel 10 (0, 0) and the pixel 10 (0, 1) are distributed to a capacitor C at the FD 14 in the pixel 10 (0, 0) and to a capacitor C at the FD 14 in the pixel 10 (0, 1). In addition, the electric charges transferred from the photoelectric conversion units 11 in the pixel 10 (0, 2) and the pixel 10 (0, 3) are distributed to a capacitor C at the FD 14 in the pixel 10 (0, 2) and to a capacitor C at the FD 14 in the pixel 10 (0, 3).

Since the signal SEL1<0> is at high level at the time point t2, a sum pixel signal generated by averaging signals from the two pixels 10 (0, 0) and 10 (0, 1) is output to the vertical signal line VLa via the selection unit 16 in the pixel 10 (0, 0). A sum pixel signal generated by averaging signals from the two pixels 10 (0, 2) and 10 (0, 3) is output to the vertical signal line VLc via the selection unit 16 in the pixel 10 (0, 2). The sum pixel signals from the pixels 10 in the first row, having been output to the vertical signal lines VLa and VLc, are respectively input to the column circuit units 40a and 40c where they are converted to digital signals.

During a time period elapsing between a time point t3 and a time point t5, noise signals and sum pixel signals from the pixels in the second row are read out in the same way as the noise signal readout and the sum pixel readout executed during time period elapsing between the time point t1 and the time point t3. During a time period elapsing between the time point t5 and a time point t7, noise signals and sum pixel signals from the pixels in the third row are read out in the same way as the noise signal readout and the sum pixel readout executed during the time period elapsing between the time point t1 and the time point t3. Through the single-row readout method, pixels 10 are sequentially selected in units of individual rows, signals generated via the photoelectric conversion units in two pixels 10 are added together and the resulting sum pixel signal can be read out to a first vertical signal line VLa. In addition, since the electric current supply from the second electric current source 25b is stopped, the power consumption in the image sensor 3 can be reduced.

In the simultaneous two-row readout method shown in FIG. 12, the vertical transfer unit 50 sets the signal ADD_FD2 and the signal ADD_SF2 to high level, as in the single-row readout method explained in reference to FIG. 11. It is to be noted that the signal ADD_FD1 and the signal ADD_SF1 are each set to low level. In addition, the signal CS1_EN is set to high level and the signal CS2_EN, too, is set to high level. With the signal CS1_EN set to high level, electric currents are provided to the vertical signal lines VLa and VLc respectively from the electric current sources 25a and 25c. Moreover, with the signal CS2_EN set to high level, electric currents are provided to the vertical signal lines VLb and VLd respectively from the electric current sources 25b and 25d.

At a time point t1 in FIG. 12, the signals RS<0> and RS<1> shift to high level, thereby setting the transistors M2 constituting the reset units 13 in the pixels in the first row and the pixels in the second row (the pixel 10 (0, 0) through the pixel 10 (1, 3)) in an ON state. In this situation, the potentials at the FDs 14 electrically connected with each other, are averaged.

In addition, at the time point t1, the signal SEL1<0> shifts to high level and as a result, a noise signal generated by averaging signals from the two pixels 10 (0, 0) and 10 (0, 1) is output to the vertical signal line VLa via the selection unit 16 in the pixel 10 (0, 0). A noise signal generated by averaging signals from the two pixels 10 (0, 2) and 10 (0, 3) is output to the vertical signal line VLc via the selection unit 16 in the pixel 10 (0, 2). Furthermore, at the time point t1, the signal SEL2<1> shifts to high level and as a result, a noise signal generated by averaging signals from the two pixels 10 (1, 0) and 10 (1, 1) is output to the vertical signal line VLb via the selection unit 16 in the pixel 10 (1, 1). A noise signal generated by averaging signals from the two pixels 10 (1, 2) and 10 (1, 3) is output to the vertical signal line VLd via the selection unit 16 in the pixel 10 (1, 3), as well. The noise signals from the pixels 10 in the first row and the second row having been output to the vertical signal lines VLa through VLd are respectively input to the column circuit units 40a through 40d where they are converted to digital signals.

At a time point t2, the signal TX<0> shifts to high level, thereby setting the transistors M1 constituting the transfer units 12 in the pixels 10 (0, 0) through 10 (0, 3) in an ON state and thus causing electric charges resulting from photoelectric conversion in the photoelectric conversion units 11 to be transferred to the FDs 14. In addition, at the time point t2, the signal TX<1> shifts to high level, thereby setting the transistors M1 constituting the transfer units 12 in the pixels 10 (1, 0) through 10 (1, 3) in an ON state and thus causing electric charges resulting from photoelectric conversion in the photoelectric conversion units 11 to be transferred to the FDs 14.

Furthermore, at the time point t2, the signal SEL1<0> is at high level and thus, a sum pixel signal representing the sum of signals from the two pixels 10 (0, 0) and 10 (0, 1) is output to the vertical signal line VLa via the selection unit 16 in the pixel 10 (0, 0). A sum pixel signal generated by adding together signals from the two pixels 10 (0, 2) and 10 (0, 3) is output to the vertical signal line VLc via the selection unit 16 in the pixel 10 (0, 2), as well. Moreover, at the time point t2, the signal SEL2<1> is at high level and as a result, a sum pixel signal representing the sum of the signals from the two pixels 10 (1, 0) and 10 (1, 1) is output to the vertical signal line VLb via the selection unit 16 in the pixel 10 (1, 1). A sum pixel signal representing the sum of signals from two pixels 10 (1, 2) and 10 (1, 3) is output to the vertical signal line VLd via the selection unit 16 in the pixel 10 (1, 3). The sum pixel signals from the pixels 10 in the first row and the second row having been output to the vertical signal lines VLa through VLd are respectively input to the column circuit units 40a through 40d where they are converted to digital signals.

During a time period elapsing between a time point t3 and a time point t5, signal readout from the pixels in the third row and signal readout from the pixels in the fourth row are executed simultaneously in the same way as in the signal readout operation executed during the time period elapsing between the time point t1 and the time point 3. During a time period elapsing between the time point t5 and a time point 7, signal readout from the pixels in the fifth row and signal readout from the pixels in the sixth row are executed simultaneously in the same way as in the signal readout operation executed during the time period elapsing between the time point t1 and the time point t3. As described above, signal readouts from the pixels in two rows can be executed simultaneously through the simultaneous two-row readout method. As a result, signals can be read out at high speed from the individual pixels 10 disposed in the image sensor 3.

The following variations are also within the scope of the present invention and one of the variations or a plurality of variations may be adopted in combination with one of the embodiments described above.

Variation 1

Figure 13:
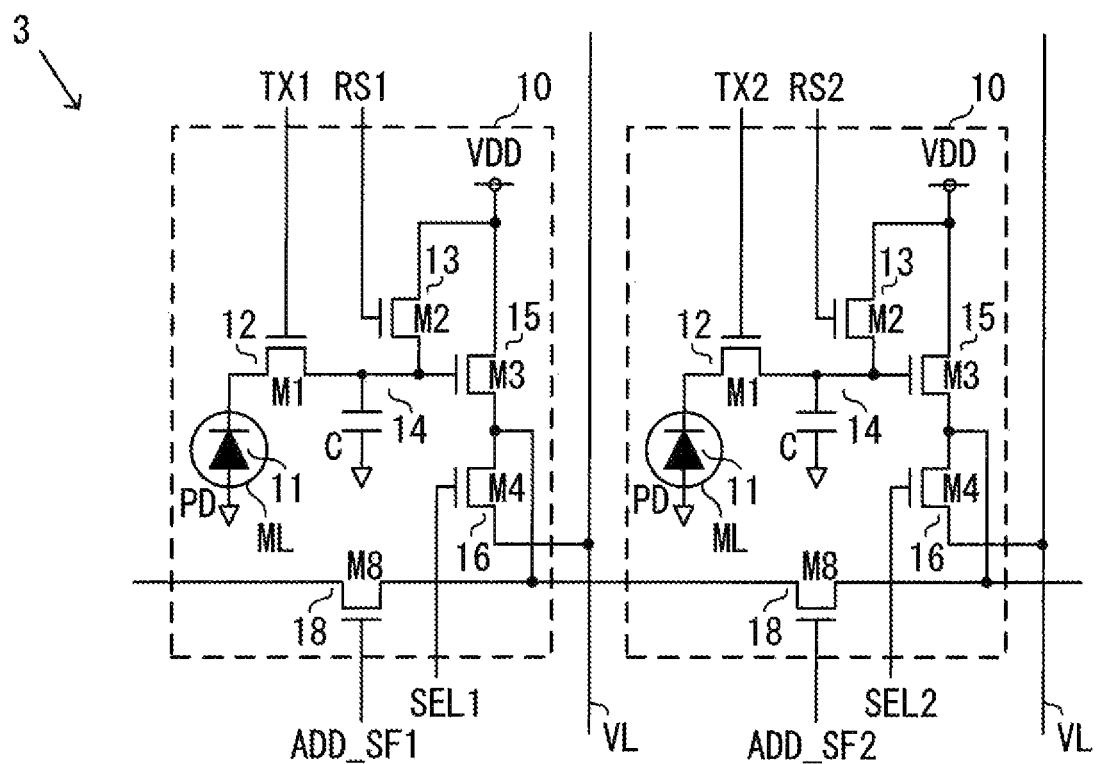

In the third embodiment described above, an addition switch unit 17 is disposed in each pixel 10. As an alternative, pixels may adopt a structure that does not include an addition switch unit 17 as shown in FIG. 13. In this case, the transistors M8 constituting the coupler switch units 18 are set in an OFF state and an operation similar to that in the third embodiment is executed in the first control mode. In the second control mode, the transistors M8 constituting the coupler switch units 18 in the individual pixels 10 are set in an ON state and thus, the amplifier units 15 in the pixels 10 become electrically connected. As a result, sum pixel signals each generated by adding together and averaging signals from the amplifier units 15 in pixels 10 are output to vertical signal lines VL. In variation 1, a signal representing the sum of signals from a plurality of photoelectric conversion units can be output to a vertical signal line by connecting the amplifier units 15 in the plurality of pixels 10 with one another via their coupler switch units 18 as described above. It is to be noted that a coupler switch unit 18 does not need to be disposed in each pixel 10. Namely, a coupler switch unit 18 disposed in correspondence to a plurality of pixels may be shared among the plurality of pixels. In addition, an addition switch unit 17, disposed in correspondence to a plurality of pixels, may be shared among the plurality of pixels as well.

Variation 2

While two photoelectric conversion units are disposed in each pixel in the example described reference to the first embodiment, another structure may be adopted in each pixel. Namely, pixels may adopt a structure that includes three or more photoelectric conversion units disposed in each pixel. In such a case, signals from the plurality of photoelectric conversion units may be separately and independently read out in the first mode and a signal representing the sum of signals from two or more photoelectric conversion units among the plurality of photoelectric conversion units may be read out in the second control mode.

Variation 3

In the embodiments and the variations thereof described above, the photoelectric conversion units are each constituted with a photodiode. As an alternative, photoelectric conversion units each constituted with a photoelectric conversion film may be used.

Variation 4

The image sensor 3 having been described in reference to the embodiments and the variations thereof may be adopted in a camera, a smart phone, a tablet, a built-in camera in a PC, an on-vehicle camera, a camera installed in an unmanned aircraft (such as a drone or a radio-controlled airplane) and the like.

While the embodiments and variations thereof have been described, the present invention is not limited to the particulars of these examples. Any other mode conceivable within the scope of the technical teaching of the present invention is within the scope of the present invention.

The disclosure of the following priority application is herein incorporated by reference:
Japanese Patent Application No. 2017-16283 filed Jan. 31, 2017

REFERENCE SIGNS LIST 3 image sensor, 4 control unit, 10 pixel, 11a first photoelectric conversion unit, 11b second photoelectric conversion unit, 17 addition switch unit, 18 coupler switch unit, 50 vertical transfer unit

The invention claimed is:
1. An image sensor comprising:
a first floating diffusion to which a first photoelectrically converted electric charge is transferred;
a second floating diffusion to which a second photoelectrically converted electric charge is transferred;
a first amplifier connected to the first floating diffusion;
a second amplifier connected to the second floating diffusion;
a first output signal line connected to a source of the first amplifier and to which the first amplifier outputs a first pixel signal;
a second output signal line connected to a source of the second amplifier and to which the second amplifier outputs a second pixel signal; and a first connection switch that controls a connection between the first amplifier and the first output signal line and between the second amplifier and the second output signal line.

2. The image sensor according to claim 1, further comprising:
a first photoelectric converter that photoelectrically converts light that passed through a first microlens to output the first photoelectrically converted electric charge; and
a second photoelectric converter that photoelectrically converts light that passed through a second microlens different from the first microlens to output the second photoelectrically converted electric charge.

3. The image sensor according to claim 1, further comprising:
a first current source connected to the first amplifier via the first output signal line; and
a second current source connected to the second amplifier via the second output signal line, wherein:
the first current source and the second amplifier are connectable to each other via the first connection switch.

4. The image sensor according to claim 3, wherein:
when the second current source stops generating a current, the first connection switch places the first current source and the second amplifier in a connected state.

5. The image sensor according to claim 3, wherein:
when the first current source supplies a current to the first amplifier and the second current source supplies a current to the second amplifier, the first connection switch is placed in a disconnected state.

6. The image sensor according to claim 4, wherein:
when the first connection switch is placed in the connected state, the first current source supplies a current to the first amplifier and to the second amplifier, causing the second amplifier to operate in a saturation region.

7. The image sensor according to claim 3, wherein:
when the first current source supplies a current to the first amplifier and to the second amplifier, the first connection switch is placed in a connected state.

8. The image sensor according to claim 3, wherein:
when (i) the first pixel signal is output from the first amplifier to the first output signal line, (ii) the second pixel signal is output from the second amplifier to the first output signal line, and (iii) the first connection switch is placed in a connected state, a current is supplied to the second amplifier from the first current source via the first connection switch.

9. The image sensor according to claim 3, wherein:
when (i) the first pixel signal is output from the first amplifier to the first output signal line, (ii) the second pixel signal is output from the second amplifier to the second output signal line, and (iii) the first connection switch is placed in a disconnected state, a first current is supplied to the first amplifier from the first current source, and a second current is supplied to the second amplifier from the second current source.

10. The image sensor according to claim 1, further comprising:
a second connection switch that controls a connection of the first floating diffusion with the second floating diffusion.

11. The image sensor according to claim 10, wherein:
when (i) the first photoelectrically converted electric charge and the second photoelectrically converted electric charge are accumulated in the first floating diffusion and the second floating diffusion, and (ii) a signal based upon the electric charge accumulated in the first floating diffusion and the electric charge accumulated in the second floating diffusion is output from the first amplifier and the second amplifier to the first output signal line, the first connection switch and the second connection switch are placed in a connected state, and a current is supplied from the first current source to the second amplifier via the first connection switch.

12. The image sensor according to claim 10, wherein:
when (i) the first photoelectrically converted electric charge is accumulated in the first floating diffusion, (ii) the second photoelectrically converted electric charge is accumulated in the second floating diffusion, (iii) a first signal based upon the electric charge accumulated in the first floating diffusion is output from the first amplifier to the first output signal line, and (iv) a second signal based upon the electric charge accumulated in the second floating diffusion is output from the second amplifier to the second output signal line, the first and second connection switches are placed in a disconnected state, a first current is supplied to the first amplifier from the first current source, and a second current is supplied to the second amplifier from the second current source.

13. The image sensor according to claim 1, further comprising:
a first selection portion connected to the first amplifier and the first output signal line; and
a second selection portion connected to the second amplifier and the second output signal line, wherein:
the first amplifier is connected to the first output signal line via the first selection portion; and
the second amplifier is connected to the second output signal line via the second selection portion.

14. The image sensor according to claim 13, wherein:
the first connection switch can interconnect (i) a region between the first amplifier and the first selection portion to (ii) a region between the second amplifier and the second selection portion.

15. The image sensor according to claim 13, wherein:
when the first selection portion places the first amplifier and the first output signal line in a connected state and the second selection portion places the second amplifier and the second output signal line in a disconnected state, the first connection switch is placed in a connected state, and a current is supplied from the first current source to the second amplifier via the first connection switch.

16. The image sensor according to claim 13, wherein:
when the first selection portion places the first amplifier and the first output signal line in a connected state and the second selection portion places the second amplifier and the second output signal line in a connected state, the first connection switch is placed in a disconnected state, a first current is supplied from the first current source to the first amplifier, and a second current is supplied from the second current source to the second amplifier.

17. The image sensor according to claim 2, further comprising:
a first transfer portion connected to the first photoelectric converter; and
a second transfer portion connected to the second photoelectric converter, wherein:

the first photoelectric converter is connected to the first floating diffusion via the first transfer portion, and the second photoelectric converter is connected to the second floating diffusion via the second transfer portion.

18. The image sensor according to claim 1, further comprising:
   a first reset portion connected to the first floating diffusion; and
   a second reset portion connected to the second floating diffusion, wherein:
   the first floating diffusion is connected to the first amplifier via the first reset portion; and
   the second floating diffusion is connected to the second amplifier via the second reset portion.

19. An image-capturing device comprising the image sensor according to claim 1.

* * * * *